US009727440B2

(12) United States Patent
Suit

(10) Patent No.: US 9,727,440 B2
(45) Date of Patent: Aug. 8, 2017

(54) AUTOMATIC SIMULATION OF VIRTUAL MACHINE PERFORMANCE

(75) Inventor: John M. Suit, Mount Airy, MD (US)

(73) Assignee: Red Hat, Inc., Raleigh, NC (US)

( * ) Notice: Subject to any disclaimer, the term of this patent is extended or adjusted under 35 U.S.C. 154(b) by 648 days.

(21) Appl. No.: 12/979,259

(22) Filed: Dec. 27, 2010

(65) Prior Publication Data
US 2012/0167084 A1 Jun. 28, 2012

(51) Int. Cl.
G06F 9/45 (2006.01)
G06F 11/34 (2006.01)
G06F 11/30 (2006.01)

(52) U.S. Cl.
CPC ...... *G06F 11/3495* (2013.01); *G06F 11/3433* (2013.01); *G06F 11/3051* (2013.01); *G06F 11/3055* (2013.01); *G06F 11/3079* (2013.01); *G06F 2201/81* (2013.01); *G06F 2201/815* (2013.01)

(58) Field of Classification Search
None
See application file for complete search history.

(56) References Cited

U.S. PATENT DOCUMENTS

| 5,440,719 | A |   | 8/1995 | Hanes et al. |
| 6,513,059 | B1 |   | 1/2003 | Gupta et al. |
| 6,658,465 | B1 |   | 12/2003 | Touboul |
| 6,836,800 | B1 | * | 12/2004 | Sweet ................. G06F 11/0709 709/224 |
| 6,871,223 | B2 |   | 3/2005 | Drees |
| 6,901,442 | B1 | * | 5/2005 | Schwaller ........... H04L 43/0817 709/223 |
| 7,082,463 | B1 |   | 7/2006 | Bradley et al. |
| 7,181,769 | B1 |   | 2/2007 | Keanini et al. |
| 7,356,679 | B1 |   | 4/2008 | Le et al. |
| 7,409,719 | B2 |   | 8/2008 | Armstrong et al. |
| 7,546,598 | B2 | * | 6/2009 | Blumenthal ........ G06F 11/3428 714/38.14 |
| 7,571,349 | B2 |   | 8/2009 | Levidow et al. |
| 7,600,259 | B2 |   | 10/2009 | Qi |
| 7,624,172 | B1 |   | 11/2009 | Austin-Lane |
| 7,698,545 | B1 |   | 4/2010 | Campbell et al. |
| 7,761,917 | B1 |   | 7/2010 | Kumar |

(Continued)

FOREIGN PATENT DOCUMENTS

| WO | 2005050414 A1 | 6/2005 |
| WO | 2005101782 A1 | 10/2005 |

OTHER PUBLICATIONS

Gao et al. A Fast and Generic Hybrid Simulation Approach Using C Virtual Machine ACM 978-1-50503-826-8/07/0009 CASES '07, Sep. 30, 2007.*

(Continued)

*Primary Examiner* — Omar Fernandez Rivas
*Assistant Examiner* — Cuong Luu
(74) *Attorney, Agent, or Firm* — Lowenstein Sandler LLP

(57) ABSTRACT

A method and apparatus of simulating performance characteristics of a virtual machine are disclosed. An example method may include selecting and inserting a virtual machine into a business application service group that includes a plurality of enterprise network devices, initiating a simulation sequence for a predetermined amount of time, recording results of the simulation sequence, and storing the results in memory.

20 Claims, 9 Drawing Sheets

(56) References Cited

U.S. PATENT DOCUMENTS

| | | |
|---|---|---|
| 7,769,720 B2 | 8/2010 | Armington |
| 7,774,498 B1 | 8/2010 | Kraemer et al. |
| 7,793,162 B2 | 9/2010 | Mock et al. |
| 7,826,602 B1 | 11/2010 | Hunyady et al. |
| 7,877,781 B2 | 1/2011 | Lim |
| 7,886,294 B2 | 2/2011 | Dostert et al. |
| 7,890,318 B2 | 2/2011 | Castellani et al. |
| 7,949,404 B2 | 5/2011 | Hill |
| 7,953,696 B2 | 5/2011 | Davis et al. |
| 7,962,738 B2 | 6/2011 | Zimmer et al. |
| 7,975,058 B2 | 7/2011 | Okmianski et al. |
| 7,987,359 B2 | 7/2011 | Kawano et al. |
| 7,996,836 B1 | 8/2011 | McCorkendale et al. |
| 8,098,658 B1 | 1/2012 | Ranganathan et al. |
| 8,102,781 B2 | 1/2012 | Smith |
| 8,127,290 B2 | 2/2012 | Suit |
| 8,145,760 B2 | 3/2012 | Dinda et al. |
| 8,156,378 B1 | 4/2012 | Suit |
| 8,161,475 B2 | 4/2012 | Araujo, Jr. et al. |
| 8,185,442 B2 | 5/2012 | Kiran Vedula |
| 8,191,141 B2 | 5/2012 | Suit et al. |
| 8,234,377 B2 | 7/2012 | Cohn |
| 8,250,182 B2 | 8/2012 | Frank et al. |
| 8,295,277 B2 | 10/2012 | Vadlakonda et al. |
| 8,336,108 B2 | 12/2012 | Suit et al. |
| 8,356,353 B2 * | 1/2013 | Futoransky et al. .......... 726/25 |
| 8,396,946 B1 | 3/2013 | Brandwine et al. |
| 8,429,748 B2 | 4/2013 | Suit et al. |
| 8,478,878 B2 * | 7/2013 | Freimuth ............ G06F 9/45558 709/223 |
| 8,539,570 B2 | 9/2013 | Sharma et al. |
| 8,560,671 B1 * | 10/2013 | Yahalom ............ H04L 67/1097 709/224 |
| 8,656,009 B2 | 2/2014 | Suit |
| 8,656,219 B2 | 2/2014 | Suit |
| 8,850,423 B2 | 9/2014 | Barkie et al. |
| 8,850,442 B2 | 9/2014 | Davis et al. |
| 8,903,983 B2 | 12/2014 | Bakman et al. |
| 9,043,785 B1 | 5/2015 | Suit |
| 9,104,458 B1 | 8/2015 | Brandwine et al. |
| 2003/0014626 A1 | 1/2003 | Poeluev et al. |
| 2003/0046586 A1 | 3/2003 | Bheemarasetti et al. |
| 2003/0084329 A1 | 5/2003 | Tarquini |
| 2003/0101245 A1 | 5/2003 | Srinivasan et al. |
| 2003/0120935 A1 | 6/2003 | Teal et al. |
| 2003/0145225 A1 | 7/2003 | Bruton, III et al. |
| 2003/0158983 A1 | 8/2003 | Dalakuras et al. |
| 2003/0177112 A1 | 9/2003 | Gardner |
| 2003/0182597 A1 * | 9/2003 | Coha ................ G06F 11/3457 714/38.1 |
| 2003/0225876 A1 | 12/2003 | Oliver et al. |
| 2004/0122937 A1 | 6/2004 | Huang et al. |
| 2004/0133672 A1 | 7/2004 | Bhattacharya et al. |
| 2005/0010765 A1 | 1/2005 | Swander et al. |
| 2005/0044206 A1 | 2/2005 | Johansson et al. |
| 2005/0102529 A1 | 5/2005 | Buddhikot et al. |
| 2005/0125503 A1 | 6/2005 | Iyengar et al. |
| 2005/0125520 A1 | 6/2005 | Hanson et al. |
| 2005/0240558 A1 | 10/2005 | Gil et al. |
| 2005/0240606 A1 | 10/2005 | Edelstein et al. |
| 2005/0268298 A1 | 12/2005 | Hunt et al. |
| 2005/0289648 A1 | 12/2005 | Grobman et al. |
| 2006/0036426 A1 * | 2/2006 | Barr ................ G06F 17/5009 703/22 |
| 2006/0037072 A1 | 2/2006 | Rao et al. |
| 2006/0041885 A1 | 2/2006 | Broquere et al. |
| 2006/0069768 A1 | 3/2006 | Wen et al. |
| 2006/0074833 A1 | 4/2006 | Gardner et al. |
| 2006/0123133 A1 | 6/2006 | Hrastar |
| 2006/0136720 A1 | 6/2006 | Armstrong et al. |
| 2006/0156380 A1 | 7/2006 | Gladstone et al. |
| 2006/0195715 A1 | 8/2006 | Herington |
| 2006/0230134 A1 | 10/2006 | Qian et al. |
| 2006/0271395 A1 | 11/2006 | Harris et al. |
| 2007/0011667 A1 | 1/2007 | Subbiah et al. |
| 2007/0043860 A1 | 2/2007 | Pabari |
| 2007/0058551 A1 | 3/2007 | Brusotti et al. |
| 2007/0061382 A1 | 3/2007 | Davis et al. |
| 2007/0083506 A1 | 4/2007 | Liddell et al. |
| 2007/0118394 A1 | 5/2007 | Cahoon |
| 2007/0130566 A1 | 6/2007 | van Rietschote et al. |
| 2007/0147271 A1 | 6/2007 | Nandy et al. |
| 2007/0169121 A1 | 7/2007 | Hunt et al. |
| 2007/0198656 A1 | 8/2007 | Mazzaferri et al. |
| 2007/0204153 A1 | 8/2007 | Tome et al. |
| 2007/0220121 A1 | 9/2007 | Suwarna |
| 2007/0234412 A1 | 10/2007 | Smith et al. |
| 2007/0238524 A1 | 10/2007 | Harris et al. |
| 2007/0261112 A1 | 11/2007 | Todd et al. |
| 2008/0005124 A1 | 1/2008 | Jung et al. |
| 2008/0016115 A1 | 1/2008 | Bahl et al. |
| 2008/0016570 A1 | 1/2008 | Capalik |
| 2008/0047009 A1 | 2/2008 | Overcash et al. |
| 2008/0056487 A1 | 3/2008 | Akyol et al. |
| 2008/0089338 A1 | 4/2008 | Campbell et al. |
| 2008/0126856 A1 | 5/2008 | Levidow et al. |
| 2008/0140795 A1 | 6/2008 | He et al. |
| 2008/0184225 A1 | 7/2008 | Fitzgerald et al. |
| 2008/0256010 A1 | 10/2008 | Moran et al. |
| 2008/0263658 A1 | 10/2008 | Michael et al. |
| 2008/0270049 A1 | 10/2008 | Kim et al. |
| 2008/0270104 A1 * | 10/2008 | Stratton ................ G06F 21/577 703/23 |
| 2008/0271025 A1 * | 10/2008 | Gross ................ G06F 11/3051 718/102 |
| 2008/0288962 A1 | 11/2008 | Greifeneder et al. |
| 2008/0320123 A1 | 12/2008 | Houlihan et al. |
| 2008/0320499 A1 | 12/2008 | Suit |
| 2008/0320561 A1 | 12/2008 | Suit et al. |
| 2008/0320583 A1 | 12/2008 | Sharma et al. |
| 2008/0320592 A1 | 12/2008 | Suit et al. |
| 2009/0007270 A1 * | 1/2009 | Futoransky et al. .......... 726/25 |
| 2009/0028053 A1 | 1/2009 | Kannan et al. |
| 2009/0049453 A1 | 2/2009 | Baran et al. |
| 2009/0089781 A1 | 4/2009 | Shingai et al. |
| 2009/0119301 A1 * | 5/2009 | Cherkasova ........... G06Q 10/06 |
| 2009/0172666 A1 | 7/2009 | Yahalom et al. |
| 2009/0182880 A1 | 7/2009 | Inamdar et al. |
| 2009/0182928 A1 | 7/2009 | Becker et al. |
| 2009/0183173 A1 | 7/2009 | Becker et al. |
| 2009/0204701 A1 | 8/2009 | Herzog et al. |
| 2009/0210427 A1 | 8/2009 | Eidler et al. |
| 2009/0216816 A1 | 8/2009 | Basler et al. |
| 2009/0228579 A1 | 9/2009 | Sanghvi et al. |
| 2009/0228589 A1 | 9/2009 | Korupolu |
| 2009/0254993 A1 | 10/2009 | Leone |
| 2009/0293022 A1 * | 11/2009 | Fries ................ G06F 1/206 716/132 |
| 2009/0307772 A1 | 12/2009 | Markham et al. |
| 2010/0011200 A1 | 1/2010 | Rosenan |
| 2010/0017801 A1 * | 1/2010 | Kundapur ........... G06F 9/45558 718/1 |
| 2010/0049731 A1 | 2/2010 | Kiran Vedula |
| 2010/0077078 A1 | 3/2010 | Suit et al. |
| 2010/0110932 A1 | 5/2010 | Doran et al. |
| 2010/0138390 A1 | 6/2010 | Lobo et al. |
| 2010/0146503 A1 | 6/2010 | Tsai et al. |
| 2010/0161604 A1 | 6/2010 | Mintz et al. |
| 2010/0269109 A1 | 10/2010 | Cartales |
| 2010/0281482 A1 * | 11/2010 | Pike ................ G06F 9/44505 718/102 |
| 2010/0287263 A1 | 11/2010 | Liu et al. |
| 2010/0293544 A1 | 11/2010 | Wilson et al. |
| 2010/0318609 A1 | 12/2010 | Lahiri et al. |
| 2010/0332432 A1 | 12/2010 | Hirsch |
| 2011/0113467 A1 * | 5/2011 | Agarwal ............ G06F 21/6281 726/1 |
| 2011/0126198 A1 * | 5/2011 | Vilke ................ G06F 9/54 718/1 |
| 2011/0126207 A1 * | 5/2011 | Wipfel ................ H04L 9/3213 718/104 |
| 2011/0154329 A1 * | 6/2011 | Arcese ............ G06F 9/45558 718/1 |

(56) References Cited

U.S. PATENT DOCUMENTS

| | | | |
|---|---|---|---|
| 2011/0209140 A1* | 8/2011 | Scheidel | G06F 8/61 717/172 |
| 2011/0225277 A1 | 9/2011 | Freimuth et al. | |
| 2011/0231839 A1* | 9/2011 | Bennett | G06F 9/5055 718/1 |
| 2011/0289204 A1 | 11/2011 | Hansson et al. | |
| 2012/0054346 A1* | 3/2012 | Lee | H04L 41/04 709/226 |
| 2012/0072968 A1* | 3/2012 | Wysopal | G06F 11/3612 726/1 |
| 2012/0096065 A1 | 4/2012 | Suit et al. | |
| 2012/0096134 A1 | 4/2012 | Suit | |
| 2012/0096142 A1 | 4/2012 | Suit | |
| 2012/0096143 A1 | 4/2012 | Suit | |
| 2012/0096171 A1 | 4/2012 | Suit | |
| 2012/0136989 A1* | 5/2012 | Ferris | G06F 9/4856 709/224 |
| 2012/0167214 A1 | 6/2012 | Suit et al. | |
| 2012/0185913 A1 | 7/2012 | Martinez et al. | |
| 2012/0221898 A1 | 8/2012 | Suit | |
| 2013/0055341 A1* | 2/2013 | Cooper | G06F 21/53 726/1 |
| 2013/0060839 A1 | 3/2013 | Van Biljon et al. | |
| 2013/0091496 A1* | 4/2013 | Barsness | G06F 9/45516 717/148 |
| 2013/0143522 A1* | 6/2013 | Rege | H04W 4/26 455/405 |
| 2013/0275975 A1 | 10/2013 | Masuda et al. | |
| 2014/0109083 A1* | 4/2014 | Scheidel | G06F 8/61 717/177 |
| 2015/0143366 A1 | 5/2015 | Suragi Math et al. | |

OTHER PUBLICATIONS

Magnusson et al. Simics: A Full System Simulation Platform 0018-9162/02, IEEE 2002.*

Hardwood, Aaron, Parallel Virtual Machine, Oct. 22, 2003, pp. 1-5.

Janiquec, Virtual Server 2005 R2 Common Issues and Tips-Duplicate MAC Addresses, Nov. 29, 2007, pp. 1-2 online link: http://msvirt.wordpress.com/2007/11/29/virtual-server-200545-common-issues-and-tips-duplicate-mac-addresses/.

Red Hat Office Action for U.S. Appl. No. 13/439,803, dated Aug. 31, 2012.

Red Hat Notice of Allowance for U.S. Appl. No. 13/439,803, dated Feb. 21, 2012.

Red Hat Office Action for U.S. Appl. No. 12/905,565, dated Oct. 12, 2012.

Red Hat Office Action for U.S. Appl. No. 12/905,565, dated Apr. 11, 2013.

Red Hat Office Action for U.S. Appl. No. 12/905,565, dated Sep. 27, 2013.

Red Hat Notice of Allowance for U.S. Appl. No. 12/905,565, dated Apr. 18, 2014.

Red Hat Office Action for U.S. Appl. No. 12/905,645, dated Sep. 13, 2012.

Red Hat Office Action for U.S. Appl. No. 12/905,645, dated Mar. 26, 2013.

Red Hat Office Action for U.S. Appl. No. 12/905,645, dated May 6, 2015.

Red Hat Office Action for U.S. Appl. No. 12/905,645, dated Nov. 18, 2015.

Red Hat Office Action for U.S. Appl. No. 12/905,688, dated Oct. 4, 2012.

Red Hat Office Action for U.S. Appl. No. 12/905,688, dated Feb. 27, 2013.

Red Hat Office Action for U.S. Appl. No. 12/905,688, dated Sep. 11, 2013.

Red Hat Office Action for U.S. Appl. No. 12/905,688, dated Mar. 18, 2014.

Red Hat Notice of Allowance for U.S. Appl. No. 12/905,688, dated Sep. 10, 2014.

Red Hat Office Action for U.S. Appl. No. 12/905,761, dated Oct. 22, 2012.

Red Hat Office Action for U.S. Appl. No. 12/905,761, dated Apr. 11, 2013.

Red Hat Notice of Allowance for U.S. Appl. No. 12/905,761, dated Oct. 4, 2013.

Red Hat Office Action for U.S. Appl. No. 12/905,850, dated Dec. 6, 2012.

Red Hat Office Action for U.S. Appl. No. 12/905,850, dated Jul. 30, 2013.

Red Hat Office Action for U.S. Appl. No. 12/905,850, dated Feb. 18, 2014.

Red Hat Office Action for U.S. Appl. No. 12/905,850, dated Sep. 29, 2014.

Red Hat Office Action for U.S. Appl. No. 12/905,850, dated Jun. 3, 2015.

Red Hat Office Action for U.S. Appl. No. 12/905,850, dated Dec. 22, 2015.

Red Hat Office Action for U.S. Appl. No. 12/905,879, dated Jul. 8, 2011.

Red Hat Notice of Allowance for U.S. Appl. No. 12/905,879, dated Dec. 8, 2011.

Red Hat Office Action for U.S. Appl. No. 11/767,173, dated Jul. 6, 2010.

Red Hat Office Action for U.S. Appl. No. 11/767,173, dated Dec. 14, 2010.

Red Hat Notice of Allowance for U.S. Appl. No. 11/767,173, dated Nov. 7, 2011.

Red Hat Office Action for U.S. Appl. No. 13/408,980, dated Feb. 25, 2013.

Red Hat Notice of Allowance for U.S. Appl. No. 13/408,980, dated Jun. 12, 2013.

Red Hat Office Action for U.S. Appl. No. 11/867,456, dated Aug. 1, 2011.

Red Hat Office Action for U.S. Appl. No. 11/867,456, dated Feb. 16, 2011.

Red Hat Office Action for U.S. Appl. No. 11/867,456, dated Jan. 19, 2012.

Red Hat Notice of Allowance for U.S. Appl. No. 11/867,456, dated Jul. 16, 2012.

Red Hat Office Action for U.S. Appl. No. 12/111,110, dated Mar. 17, 2011.

Red Hat Office Action for U.S. Appl. No. 12/111,110, dated Aug. 17, 2011.

Red Hat Office Action for U.S. Appl. No. 12/111,110, dated Jan. 18, 2012.

Red Hat Office Action for U.S. Appl. No. 12/111,110, dated Jun. 11, 2012.

Red Hat Notice of Allowance for U.S. Appl. No. 12/111,110, dated Jan. 31, 2013.

Red Hat Office Action for U.S. Appl. No. 12/626,872, dated Jan. 13, 2012.

Red Hat Office Action for U.S. Appl. No. 12/626,872, dated May 30, 2012.

Red Hat Notice of Allowance for U.S. Appl. No. 12/626,872, dated Dec. 20, 2012.

Red Hat Office Action for U.S. Appl. No. 12/013,304, dated Apr. 13, 2011.

Red Hat Office Action for U.S. Appl. No. 12/013,304, dated Oct. 4, 2011.

Red Hat Office Action for U.S. Appl. No. 12/013,304, dated Jul. 25, 2013.

Red Hat Notice of Allowance for U.S. Appl. No. 12/013,304, dated Sep. 18, 2014.

Red Hat Office Action for U.S. Appl. No. 12/013,314, dated Jul. 19, 2011.

Red Hat Office Action for U.S. Appl. No. 12/013,314, dated Mar. 7, 2012.

Red Hat Office Action for U.S. Appl. No. 12/013,314, dated Sep. 9, 2013.

(56) References Cited

OTHER PUBLICATIONS

Red Hat Notice of Allowance for U.S. Appl. No. 12/013,314, dated Jul. 28, 2014.
Red Hat Office Action for U.S. Appl. No. 12/979,222, dated Dec. 27, 2012.
Red Hat Office Action for U.S. Appl. No. 12/979,222, dated Jul. 2, 2013.
Red Hat Office Action for U.S. Appl. No. 12/979,222, dated Nov. 20, 2015.
Red Hat Notice of Allowance for U.S. Appl. No. 12/979,222, dated Jun. 21, 2016.
Red Hat Notice of Allowance for U.S. Appl. No. 12/979,222, dated Sep. 28, 2016.
Red Hat Office Action for U.S. Appl. No. 12/979,229, dated Apr. 4, 2013.
Red Hat Office Action for U.S. Appl. No. 12/979,229, dated Aug. 12, 2013.
Red Hat Office Action for U.S. Appl. No. 12/979,229, dated Nov. 19, 2015.
Red Hat Notice of Allowance for U.S. Appl. No. 12/979,229, dated Jun. 27, 2016.
Red Hat Office Action for U.S. Appl. No. 12/979,237, dated Jul. 1, 2013.
Red Hat Office Action for U.S. Appl. No. 12/979,237, dated Dec. 3, 2013.
Red Hat Office Action for U.S. Appl. No. 12/979,237, dated Apr. 23, 2014.
Red Hat Notice of Allowance for U.S. Appl. No. 12/979,237, dated Dec. 4, 2014.
Red Hat Notice of Allowance for U.S. Appl. No. 12/979,237, dated Jun. 25, 2015.
Red Hat Notice of Allowance for U.S. Appl. No. 12/979,237, dated Jan. 14, 2016.
Red Hat Office Action for U.S. Appl. No. 12/979,245, dated Jan. 8, 2013.
Red Hat Office Action for U.S. Appl. No. 12/979,245, dated May 24, 2013.
Red Hat Office Action for U.S. Appl. No. 12/979,245, dated Jul. 22, 2015.
Red Hat Office Action for U.S. Appl. No. 12/979,245, dated Nov. 23, 2015.
Red Hat Notice of Allowance for U.S. Appl. No. 12/979,245, dated Jun. 29, 2016.
Red Hat Office Action for U.S. Appl. No. 12/979,255, dated Dec. 27, 2012.
Red Hat Office Action for U.S. Appl. No. 12/979,255, dated May 3, 2013.
Red Hat Office Action for U.S. Appl. No. 12/979,255, dated Jul. 7, 2015.
Red Hat Office Action for U.S. Appl. No. 12/979,255, dated Nov. 23, 2015.
Red Hat Notice of Allowance for U.S. Appl. No. 12/979,255, dated Jun. 14, 2016.
Red Hat Notice of Allowance for U.S. Appl. No. 12/979,229, dated Oct. 19, 2016.

* cited by examiner

… (1) …

AUTOMATIC SIMULATION OF VIRTUAL MACHINE PERFORMANCE

CROSS REFERENCE TO RELATED APPLICATIONS

This application relates to co-pending applications: U.S. patent application Ser. No. 11/767,173, filed on Jun. 22, 2007, titled "Method and system for cloaked observation and remediation of software attacks"; U.S. patent application Ser. No. 11/867,456, filed on Oct. 4, 2007, titled "Method and system for collaboration involving enterprise nodes"; and U.S. patent application Ser. No. 12/626,872, filed on Nov. 27, 2009, titled "Network traffic analysis using a dynamically updating ontological network description."

This application further relates to the Applicant's co-pending applications:

"System and method for identification of business process application service groups", U.S. patent application Ser. No. 12/905,565.

"System and method for migration of network entities to a cloud infrastructure", U.S. patent application Ser. No. 12/905,645.

"System and method for monitoring system performance changes based on configuration modification", U.S. patent application Ser. No. 12/905,688.

"System and method for indicating the impact to a business application service group resulting from a change in state of a single business application service group node", U.S. patent application Ser. No. 12/905,761.

"System and method for enterprise nodes that are contained within a public cloud to communicate with private enterprise infrastructure dependencies", U.S. patent application Ser. No. 12/905,850.

"System and method for indicating the impact to a business application service group resulting from a change in state of a single business application service group node", U.S. patent application Ser. No. 12/905,879.

U.S. Patent Application No. 12/979,229, filed on Dec. 27, 2010 titled "Automatic Determination of Required Resource Allocation of Virtual Machines."

U.S. Patent Application No. 12/979,237, filed on Dec. 27, 2010 titled "Assigning Virtual Machines To Business Application Service Groups Based On Ranking Of The Virtual Machines." now issued U.S. Pat. No. 9,354,960

U.S. Patent Application No. 12/979,245, filed on Dec. 27,2010 titled "Automatic Baselining of Business Application Service Groups Comprised of Virtual Machines." now issued U.S. Pat. No. 9,495,152, U.S. Patent Application No. 12/979,259, filed on Dec. 27, 2010 titled "Automatic Simulation of Virtual Machine Performance."

U.S. Patent Application No. 12/979,259, filed on Dec. 27, 2010 titled "Automatic Simulation of Virtual Machine Performance."

The entire contents of each of the above mentioned applications are specifically incorporated herein by reference in their entireties.

TECHNICAL FIELD

Embodiments of the invention relate to simulating virtual machine performance, and, in particular, to performing automatic simulation of one or more virtual machines and determining if the network nodes will meet predetermined performance thresholds.

BACKGROUND

Traditionally enterprises are comprised of various nodes that contribute to an overall business process. An enterprise may be thought of as a geographically dispersed network under the jurisdiction of one organization. It often includes several different types of networks and computer systems from different vendors.

These network nodes that are part of the enterprise may be comprised of both physical and virtual machines. Enterprise networks that include a plurality of virtual machines may require a physical host, which is required to allocate resources among the virtual machines.

Groups of network nodes included in the enterprise may form business process application service groups (BASGs). The "components" of these groups are comprised of virtual machines, hosts, storage devices and network devices. Each of these components may be dependent on one another. In an operational enterprise environment, enterprise nodes change dynamically. For instance, nodes are configured, re-configured, migrated, placed off-line, and may experience varying changes throughout the life of the node. Measuring the performance of the network and its corresponding nodes may provide the information necessary to maintain optimal operating conditions of the BASGs. Additionally, testing a particular network configuration may provide feedback necessary to determine whether additional changes should be made to optimize network performance.

BRIEF DESCRIPTION OF THE DRAWINGS

Features of the invention are more fully disclosed in the following detailed description of the invention, reference being had to the accompanying drawings described in detail below.

DETAILED DESCRIPTION

Figure 1:
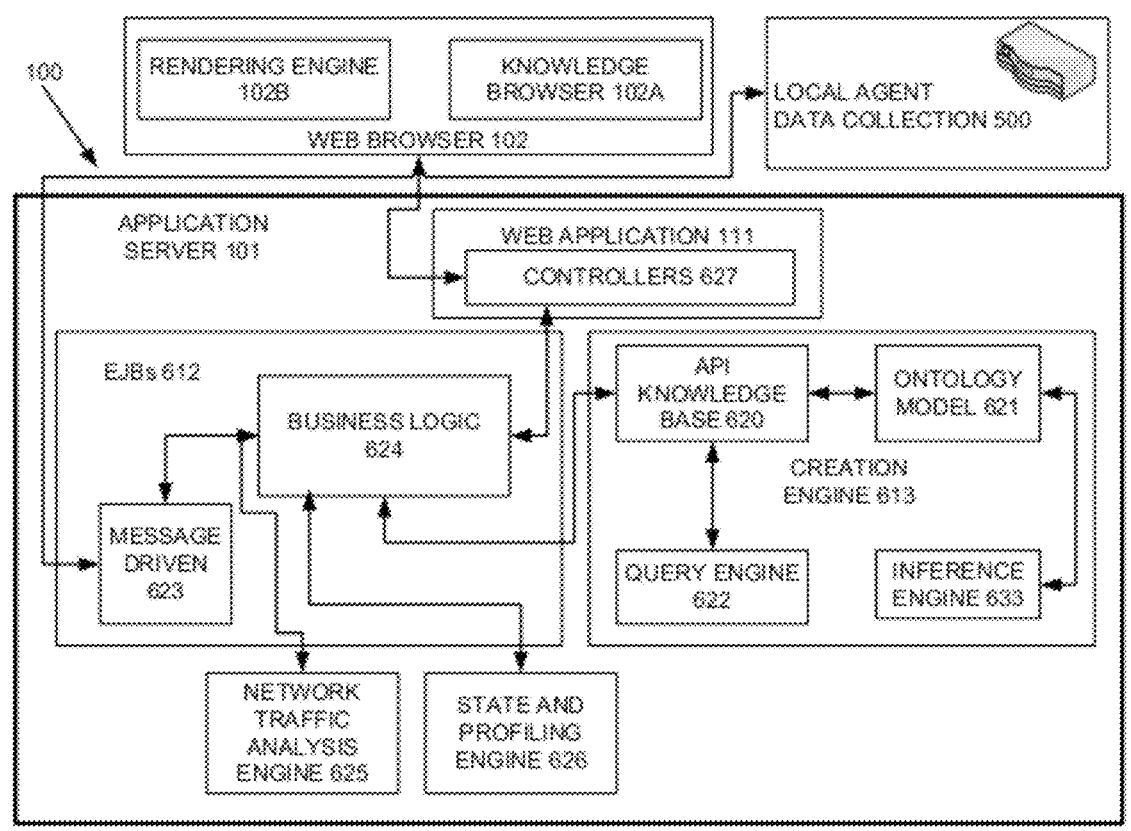
FIG. 1 illustrates an example embodiment of a system for creating and updating an ontological description of a network.

Example embodiments of the present invention may include a method of simulating performance characteristics of a virtual machine. The method may include selecting and inserting the virtual machine in a business application service group comprising a plurality of enterprise network devices. The method may also include initiating a simulation sequence for a predetermined amount of time, recording results of the simulation sequence and storing the results in a memory.

Another example embodiment of the present invention may include an apparatus to simulate performance characteristics of a virtual machine. The apparatus may include a processor to select and insert the virtual machine in a business application service group comprising a plurality of enterprise network devices, and to initiate a simulation sequence for a predetermined amount of time. The apparatus may also include a memory to store recorded results of the simulation sequence.

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Specific example embodiments of the present invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. Furthermore, "connected" or "coupled" as used herein may include wirelessly connected or coupled. It will be understood that although the terms "first" and "second" are used herein to describe various elements, these elements should not be limited by these terms.

FIG. 1 illustrates an example logic diagram of a system 100 configured to deploy data collection agents onto network nodes, according to example embodiments of the present invention. Referring to FIG. 1, an application server 101 interfaces with a web browser 102 and a local agent data collection network element 500. Certain operations may be performed, such as, monitoring network connections instantiated at each network node, acquiring resulting data, automatically creating an ontological description of the network from the acquired data, dynamically updating the ontological description, etc.

According to an example embodiment, elements of system 100 may utilize the Java® software platform and Enterprise Java Bean® (EJB) architecture to provide certain functionality. These well-known terms may be used in the description that follows. Other software platforms and architectures, providing similar functionality may be used without departing from the scope of the present invention.

System 100 may include an application server 101, which interacts across a network with a number of data collection agents 500. Application server 101, may be an element of an administrative console (AC) that also provides a suite of network management tools. A system administrator may perform network traffic analysis and/or other network management tasks by accessing application server 101 through a web browser 102. Application server 101 may consist of an EJB module 612, an ontological description creation engine 613, and a web application 111. Web browser 102 may include a rendering engine 102B and a knowledge browser 102A.

In operation, data collection agent(s) 500 may be deployed onto network nodes including physical and/or virtual machines in an enterprise information technology (IT) infrastructure environment. After such deployment, application server 101 receives messages from data collection agents 500. These messages may include data representing, for example, state and relationship information about the network nodes, configuration information related to the IT infrastructure, performance/utilization data and network communication. Thresholds are assigned to a component and/or can be assigned to an entire business application service group (BASG). A host may provide CPU usage as a resource allocated to a virtual machine, the CPU operational usage performance is an example metric. The virtual machine and host machine are both examples of components.

The received messages may be initially handled by EJB module 612. For example, message driven EJB 623 may initially inspect a received message. A received message relating to network traffic or node status may be forwarded by message driven EJB 623 to the business logic EJB 624. Business logic EJB 624 may call network traffic analysis engine 625 for messages relating to network traffic. Alternatively, "infrastructure messages" (i.e., those messages relating to node status) may be forwarded directly to the state and profiling engine 626.

Messages forwarded to the state and profiling engine 626 may undergo sorting and processing. The state and profiling engine 626, for example, may identify the entities within the IT infrastructure as well as their dependency on one another, based on messages received from the platform. In addition, state and profiling engine 626 may perform further processing to determine the state of one or more entities. State may be based on a threshold that has been defined, for example, by the system administrator. The threshold may include a metric that either exceeds or underperforms in a specific area of interest to the system administrator. An example threshold may be set for a server operating in the enterprise network that is exceeding a specified CPU utilization percentage, a disk utilization percentage and/or a memory utilization percentage.

A data output from state and profiling engine 626 may be sent to ontological description creation engine 613. Initially, the data may be handled by a resource description framework (RDF) application programming interface (API) knowledge base 620, where the data is categorized and stored utilizing a predefined entity relationship determined by ontology web language (OWL) API or ontology model 621.

Messages handled by the network traffic analysis engine 625 may include source-to-destination data, qualified by a communicating application within the operating system of the originating node, as well as frequency of communication information. This received data is analyzed by processing the number and type of connections to determine if an ontological "communicates_with" relationship exists. A determination may be made by tracking the number of connections of a specific application over a period of time. The period of time may be preselected, for example, by the system administrator.

Data output from network traffic analysis engine 625 may be sent to ontological description creation engine 613. Initially, the data may be handled by the RDF API knowledge base 620 where the data is categorized and stored utilizing a predefined entity relationship, determined by OWL API ontology model 621. For example, OWL API ontology model 621 may define what entity classes exist, their possible relationship to each other, and their possible state.

Figure 2:
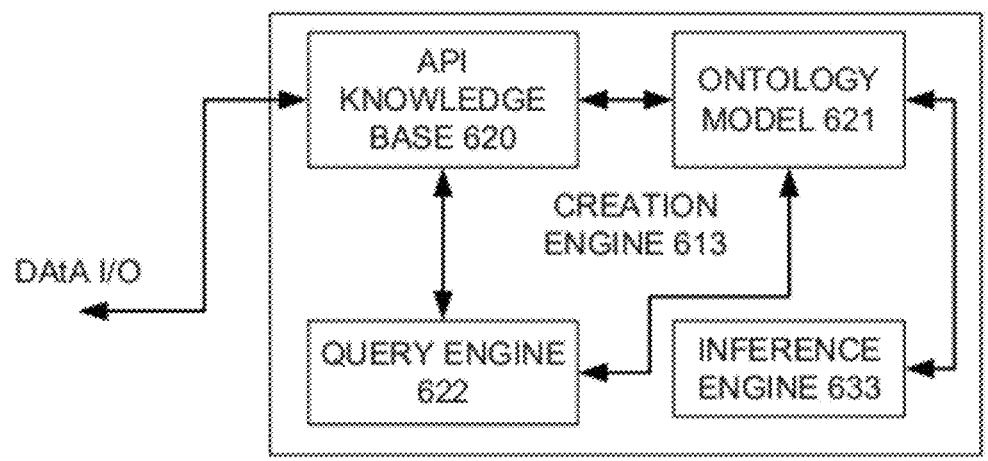
FIG. 2 illustrates a detail of ontological creation engine, according to an example embodiment.

FIG. 2 illustrates a detailed diagram of ontological description creation engine 613, according to example embodiments of the present invention. Referring to FIG. 2, as data is received by RDF API knowledge base 620, logic in the RDF API knowledge base 620 may map the incoming data to the appropriate ontological classes and relationships defined by OWL ontology API model 621. Once the correct classes and relationships are selected, the entity and relationship information may be entered into RDF API knowledge base 620. The knowledge base may also be forwarded to a SPARQL database or query engine 622 for later inference processing by inference engine 633. Inference engine 633 may determine inferred relationships based on the ontology model contained in OWL ontology API model 621.

The model and structure the system uses to create and update the knowledge base is contained within a web ontology language (OWL) file present on the application server 101. OWL is a family of knowledge representation languages for authoring ontologies which are a formal representation of the knowledge by a set of concepts within a domain and the relationships between those concepts. Ontologies are used to reason about the properties of that domain, and may be used to describe the domain. The ontology provides the direct and indirect dependency information the (SPARQL) query engine 622 requires to infer the impact a change in "state" will have on the rest of a service group or BASG.

In an enterprise network, a business application will typically include a primary application with one or more executables that execute on one or more nodes of the network. These nodes may have direct and indirect dependencies on other nodes of the network. The business application may be described by a network ontology. When an alert state occurs for the business application, the components of the business application ontology may be analyzed to determine what adjustments are required to achieve a steady state based on assigned thresholds. The root cause may be a direct or indirect root cause which may then be reported to the system administrator.

According to an example embodiment, a visualization of a current network state and/or communication activity may be provided to an administrator. The system administrator may be provided with a visual rendering (e.g., on a computer monitor) of the knowledge base. The visualization may be filtered to any selected entity of interest. For example, referring again to FIG. 1, the system administrator or other user may use a web browser 102 to request rendering of data via web application 111 from controllers 627.

Controllers 627 may pass along any filtering information such as a specific host ID. Next, business logic EJB 624 may be called by the controllers. Business logic EJB 624 may query RDF API knowledge base 620 for requested data. The requested data may be returned through controllers 627 to the web browser. The requested data may then be converted into a directed graph by a rendering engine.

Example embodiments of the present invention may provide the ability to automatically determine allocation adjustments that may be required for virtual machine performance, and to monitor the service tier thresholds assigned to a specified virtual machine. Thresholds are directly related to a node "state". The state may be defined as an indicator to the system and the user of a business application service, such as, whether, the business application service meets a specified or threshold requirement. The process to determine the state of an individual element may be based on a threshold that has been defined, for example, by the system administrator. The threshold may include a metric that either exceeds or underperforms in a specific area of interest of the system administrator. An example would be a server in a network that is exceeding a specified CPU utilization percentage.

Example embodiments of the present invention may also provide the ability to baseline business process application service groups (BASGs) within an operational enterprise environment. A service group may be comprised of one to many nodes operating on a network. The automatic baselining may be performed based on the ontological structure of the categorized BASGs.

A file may be created and stored in memory. The file may be a resource definition framework (RDF) based knowledge base file included in the ontology web language (OWL) format. The format of the file may be constructed of "triples" and data values. A triple may include a particular format, for example, CLASS-Object-Property-CLASS. The specific classes are referred to as "individuals", for instance, Person-Drove-Car may be an example triple. Another example may be "John(Individual)-Drove(Object Property)-Car(Class)." In this example, "Car" is an example class and "Drove" is an object value. If, for example, a TRIPLE existed that included "CAR-Has_name-Ferrari(Individual)", then the inference engine 633 may infer that if only one car existed in the knowledge base 620, then John(Individual)-Drove (Object property)-Ferrari(Individual) and car would be the class. This is referred to as a "triple" because there are 3 objects.

In operation, the system 100 monitors for a steady state condition of a currently operating BASG by tracking BASG service tier thresholds that have been assigned to accomplish a business process cycle (completed task) while operating within the thresholds identified as normal (Green). When the BASG being monitored operates within normal service tier threshold parameters through three consecutive business application cycles, the system 100 will consider the operating conditions of that BASG base-lined based on those currently assigned and observed service tier thresholds.

A business application process cycle may be comprised of a session that contains an initiation of network activity that is observed by the executables that are part of the primary application for the BASG. Once the communications have ceased and are verified by the user to have been completed successfully, the business application process cycle is recorded in the database.

The business application process cycle is assigned as a baseline candidate for the BASG. The system 100 creates candidates automatically by creating a record of the service tier threshold performance during a business application process cycle (BAPC), which may be validated by the user initially. The system 100 will then automatically create a baseline as illustrated in FIG. 2B. The BAPC yields the components that are involved in the "communicates_with" object value and the indirect components that support those components. The result is an automatic base-lining of service groups which form the basis for the components included in the BASG. That is, the components are used to create a relative match to a user selected categorized BASG.

The process to automatically baseline a BASG is achieved by the business logic 624 requesting the known service groups from the RDF API knowledge base 620. The SQARQL query engine 622 then initiates a query to gather all the class, object properties, and data values from the knowledge base 620. The SQARQL query engine 622 simultaneously initiates a query for performance threshold data in a database. This performance data is comprised of three separate instances of normal threshold data obtained within a business application process cycle.

The business application process cycle may be comprised of a session that contains an initiation of network activity that is observed by an agent of the executables included in the primary application for the BASG. Once the communication has ceased and is verified by the user via the web browser 102, a message is sent through the controllers 627 to the business logic 624. This business application process cycle is assigned as a baseline candidate by the resulting EJB 612, which, in turn, records the established candidate into the database.

Candidates may be created automatically by the system 100 via the SPARQL query engine 622 initiating a query for any existing candidates upon startup of the application server 101, such as, JBOSS. The SPARQL query engine 622 creates a Java Bean EJB, which, in turn sends a Java message service (JMS) message to the agent to observe network traffic that is initiated by an executable contained within a primary application. The agent will then observe for a successful completion of the business application cycle. The web browser 102 then updates the user that a baseline for a given BASG exists. The BASG baseline (see FIG. 2B) may then be monitored for changes by utilizing a configuration drift analysis.

A drift analysis method will now be described with reference to FIG. 1. Referring to FIG. 1, a user selection of a node that has been reported to have changed state via an administrative console interface inventory view is received. Nodes that are of particular importance may include those nodes that are now indicated to be in an alert state. The web browser 102, via the administrative console interface inventory view receives the request and processes the network ontology for a given node to determine any related enterprise entities that also include a changed state, including other network nodes, applications, service groups, etc. In one embodiment, related entities that are now in an alert state are determined, whether or not the indicated node is in an alert state. An RDF API knowledge base engine 620 uses the state information for the node's network ontology to generate an impact summary view that indicates the states of the related enterprise entities. The impact summary view may then be displayed to the user through the web application interface 111.

When the RDF API knowledge base 620 subsequently reports the existence of a new BASG, the configuration will be compared to the newly assigned BASG baseline to determine whether any parameters of the configuration are outside of the allowable limits set by the baseline. Over time, natural use and evolution of the network will cause changes to occur. The RDF knowledge base 620 will continue to report the current configuration of the node by way of configuration messages that include the updated configuration information.

The configuration messages are received at the state and profiling engine 626 included in a configuration bean that details the relevant data elements included within the aggregate of network nodes. For example, configuration messages may include the BASG baseline, which may include node ID, system properties, security (users and groups), applications, and resource allocations (e.g., media, CPU, memory, and other system resources). These data elements are then compared by the state and profiling engine 626 by comparing their current components, such as classes having specific individuals and data values, and the object properties with corresponding specific data values.

Virtual infrastructure messages may also be generated and communicated via the data agents 500 and these may indicate memory, CPU, disk allocations by the infrastructure and infrastructure warning messages provided by the vendor management system, such as, a VMware ESX server. The state and profiling engine 626 analyzes the configuration beans to determine whether there are any differences present when compared to the assigned baseline information. Configuration changes either relative to the baseline, or, to a previously reported configuration, may cause the state and profiling engine 626 to create a corresponding tracking entity bean that details the changes that have been made and the timing of these changes.

According to example embodiments of the present invention, tracking beans may be created for every detected configuration change. In another example, tracking beans may be created for configuration changes that violate previously defined allowable baseline drifts. In a further alternative, a combination of these methods and operations may be utilized to permit tracking beans to be created for drifts in some parameters, yet selectively created for drifts in other parameters.

In general, configuration drifts may be present in the operating conditions of the BASG(s), which would cause tracking beans to be created each time the RDF API knowledge base 621 reports the node configuration. To avoid unnecessary and persistent configuration drift alerts from being generated, comparisons may be made between a configuration report from the agent 500 and earlier generated tracking beans for that node so that tracking beans are created only for new configuration drifts.

The following terminology is used only to distinguish one element from another element. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

Networks including computer entities, physical and/or virtual machines operating on network nodes, etc., may be advantageously described via an ontology that describes the operational usage and current state of the entities rather than being based on a fixed IT infrastructure architecture. The ontological description may be automatically and dynamically updated based on data acquired from data collection agents deployed to the nodes of the network. The data collection agents observe communicative relationships based on connections between nodes in operational use, while annotating a class state. Using the ontological description, a network analyst or system operator may be provided with an improved ability to analyze network traffic.

Data relating to actual connections may be acquired automatically in near real-time. For example, an actual connection may be monitored in an interrupt-driven way while collecting information regarding an application that made the connection. Moreover a "volume for the connections" may be derived. A software-based data collection agent may be received by a computing device at a node within a communications network. The agent may be distributed to one or more nodes from a central node via the network. Once the software-based data collection agent is received, it may be inserted in an operating system of the receiving node. Advantageously, the agent may be inserted in the kernel of the operating system or in a user space (i.e., an area in virtual memory of a computer that contains user applications that execute at the application layer). The installation may be performed such that it is transparent or undetectable by a user of the node. The installed data collection agent may monitor data packet traffic between an adaptive driver layer and a protocol layer and report results of the monitoring to the central node.

In one example, the data collection agent may have an interface to an operating system's network stack and may periodically determine what applications are using the network stack. Thereby the data collection agent may track information regarding a network connection, the connection duration, and any applications and systems involved in the connection. Moreover, the data collection agent may normalize the foregoing information and report it to an administration console so that different operating systems may be correlated by the administration console.

As a further example, the data collection agent may include a network filter inserted into the network stack to determine exactly when a connection is made between entities. The filter component of the data collection agent may be inserted at one or more layers of the OSI model. For example, a data collection agent may have filter interface at the transport layer and/or a filter interface at the network layer. The data collection agent may track information regarding a network connection, the connection duration, and any applications and systems involved in the connection. Moreover, the data collection agent may normalize the foregoing information and report it to the administration console so that different operating systems may be correlated by the administration console.

As yet a further example, the data collection agent described in the preceding paragraph may also include a packet filter inserted into the network stack to track connection data. For example, a data collection agent may have a filter interface at the data link layer. Then, the data collection agent may correlate and normalize (if required) data from the network filter and the packet filter to track information regarding the network connection, the connection duration, any applications and systems involved in the connection, connection status and connection resource usage information. Moreover, the data collection agent may normalize the foregoing information and report it to the administration console so that different operating systems may be correlated by the administration console.

Referring again to FIG. 1, an illustrative system 100 for deploying data collection agents onto network nodes, monitoring network connections instantiated at each network node, acquiring resulting data, automatically creating an ontological description of the network from the acquired data; and dynamically updating the ontological description will be described. The system 100 may further be used for monitoring configuration drifts within an enterprise network as will be described in more detail below. In an embodiment, elements of system 100 utilize the Java software platform and Enterprise Java Bean (EJB) architecture to provide certain functionality, and these well-known terms may be used in the description that follows.

According to example embodiments of the present invention, the process to automatically determine a performance allocation may begin by monitoring those virtual machines that have sustained a service tier threshold in either a critical low and/or a critical high level for more than 24 hours. Such an observation may be observed by the virtual machine agent. The SQARQL query engine 622 simultaneously initiates a query for current performance threshold data stored in a database.

The components' states may be determined because they have thresholds that are achieved, overachieved, or underachieved. Nodes, executables and the business application service groups (BASGs) may also incorporate status and alerts from infrastructure providers. The Executables may have a state that relates to the "communicates_with" relationship. For example, if an executable such as sqlservr.exe no longer communicates with node X, it may be designated critical high and indicated on a user interface as red or as a warning. This example may be true of a node that represents a "communicates_with" relationship as well as a primary application represented as a node.

The state and profiling engine 626 may set the state of the business application service group (BASG) using the agent data and system information. When any component of the BASG has achieved a "High Warning" state, the user may view the component as red (indicating a high warning) as well as the BASG as in red on a graphical user interface.

The process to determine the state of an individual element may be based on a threshold that has been defined, for example, by the system administrator. The threshold may include a metric that either exceeds or underperforms in a specific area of interest to the system administrator. An example would be where a server in a network is exceeding a specified CPU utilization percentage.

Example embodiments of the present invention may automatically determine the optimum pairing of virtual machines in a business process application service group (BASG) to maximize performance as measured by a service tier threshold system. Example may include automatically analyzing the baseline of direct and indirect connections based on network interactivity of the applications that are utilized to perform a process.

A BASG is comprised of one too many nodes operating on the enterprise network. The basis for an automatic base-lining procedure may be in the ontological structure of the categorized BASG. The resulting data file may contain a structure that includes classes, object properties, and data values. The system creates a profile type for each selected BASG host, storage device, and other network dependent components/elements. This profile may include specific attributes that are used to pair virtual machines with BASGs that allow the virtual machine to execute optimally.

Example operations may provide identifying specific virtual machines to pair with a specific business BASG. One or more virtual machines may be paired with one or more BASGs. The system may determine which BASGs are best suited for a pairing based on parameters that include high availability, high capacity, high speed, moderate capacity, moderate speed, moderate availability, low capacity, low speed, and low availability. These are considered by the system to be the BASG types. The virtual machines that require these attributes are then paired to these BASGS.

Initially, the system 100 may analyze each of the BASGs performance data to determine if any of the BASGs would benefit from a newly added virtual machine pairing. This analysis may be performed by processing the aggregate service tier thresholds of the host member(s) of the BASG. For example, by processing the state information of both the storage and network BASG dependencies, the need for additional virtual machines may be apparent. The storage and network state information may be factored with the host performance threshold data and state information to determine a profile of the BASG The BASG profile may include categories, such as, categories, which may include but are not limited to high availability, high capacity, high speed, moderate capacity, moderate speed, moderate availability, low capacity, low speed, and low availability.

The system 100 may analyze the virtual machines to determine the optimal combination of host applications, storage required and network performance by analyzing the service tier threshold performance data acquired. Each virtual machine is assigned a profile requirement, such as, high availability, high capacity, high speed, moderate capacity, moderate speed, moderate availability, low capacity, low speed, and low availability. The system then pairs the virtual machine with at least one host, network, and storage group that has availability and may be assigned to a BASG. Or, alternatively, the BASG can produce availability by migrating one or more less optimally paired virtual machine elsewhere.

The system 100 may analyze the virtual machines to determine the optimal combination of host applications, storage required and network performance by analyzing the service tier threshold performance data acquired. Each virtual machine is assigned a profile requirement, such as, high availability, high capacity, high speed, moderate capacity, moderate speed, moderate availability, low capacity, low speed, and low availability. The system then pairs the virtual machine with at least one host, network, and storage group that has availability and may be assigned to a BASG. Or, alternatively, the BASG can produce availability by migrating one or more less optimally paired virtual machine elsewhere.

The system 100 may also provide a work order that can be processed by an orchestration system, or, individual, who is responsible for executing the changes. The system 100 routinely (as defined through the user interface) monitors the networking environment to maintain optimum virtual machine pairings with host, storage, and speed groups that include one or more BASGs.

Figure 3:
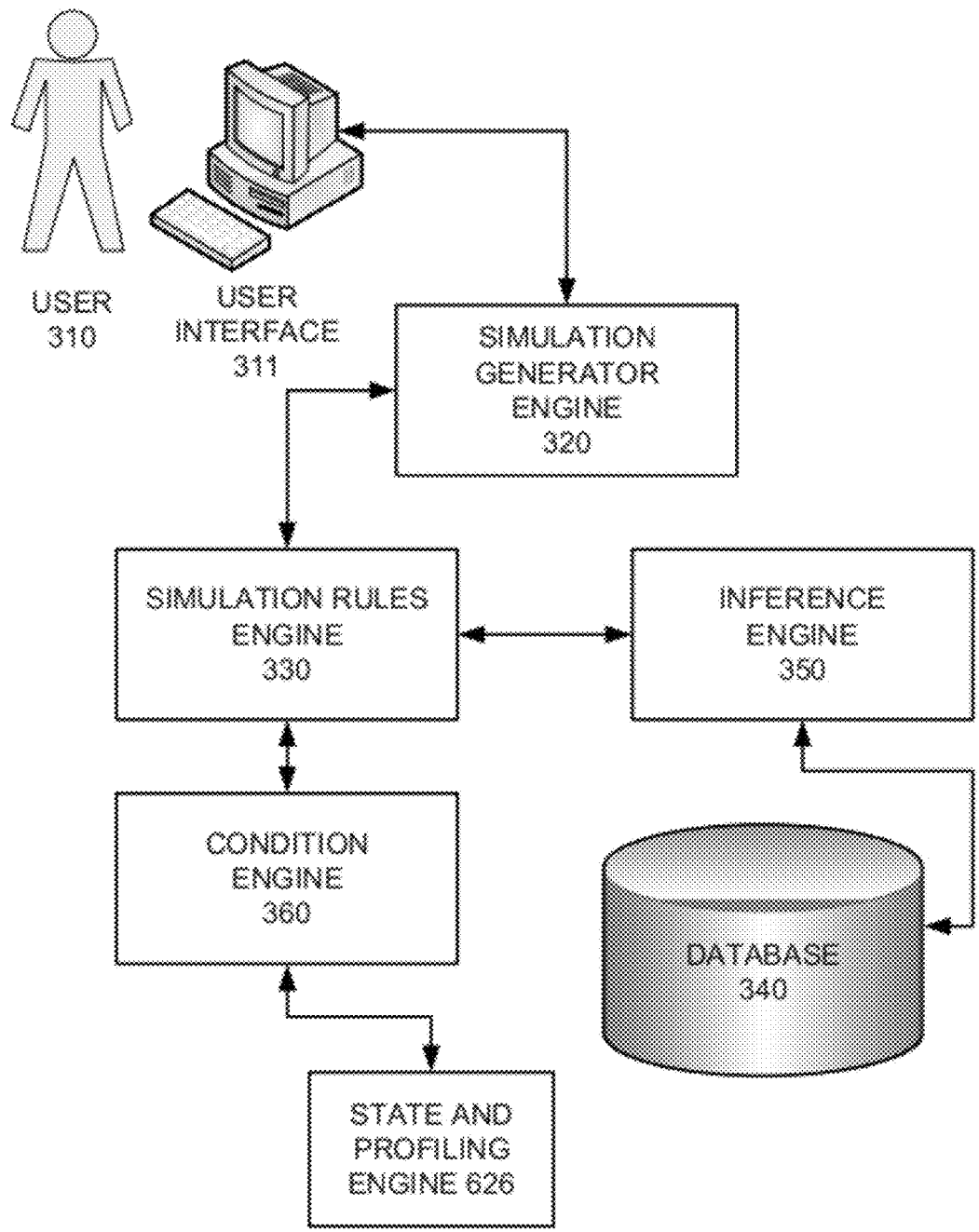
FIG. 3 illustrates an example logic diagram of a user initiated simulation, according to example embodiments of the present invention.

FIG. 3 illustrates an example system configuration used to perform a network simulation. Referring to FIG. 3, the system 100 provides a user 310 with an interface 311 to setup and execute a simulation. For example, the user may simulate the performance threshold condition of a virtual machine(s) operating in a virtual environment that includes a grouping of enterprise nodes, such as, a BASG. The enterprise nodes may be configured to communicate with each other and perform a specific task or business application, depending on the user's testing scenario. These "groups" will be referred to as BASGs, which may be predefined in the RDF API knowledge base 620.

In order to provide a simulation of the performance of the virtual machines, certain historic operating data may be required to be made available to the state and profiling engine 626. The operating data may reside in the RDF API knowledge base 620. The historic data may indicate the operational usage of one or more of the BASGs. The historic data may be based on prior simulations or actual operating conditions. Such historic operating data may be retrieved from a database 340. The historic operating data may be accessed by the EJB container within the application server.

Figure 8A:
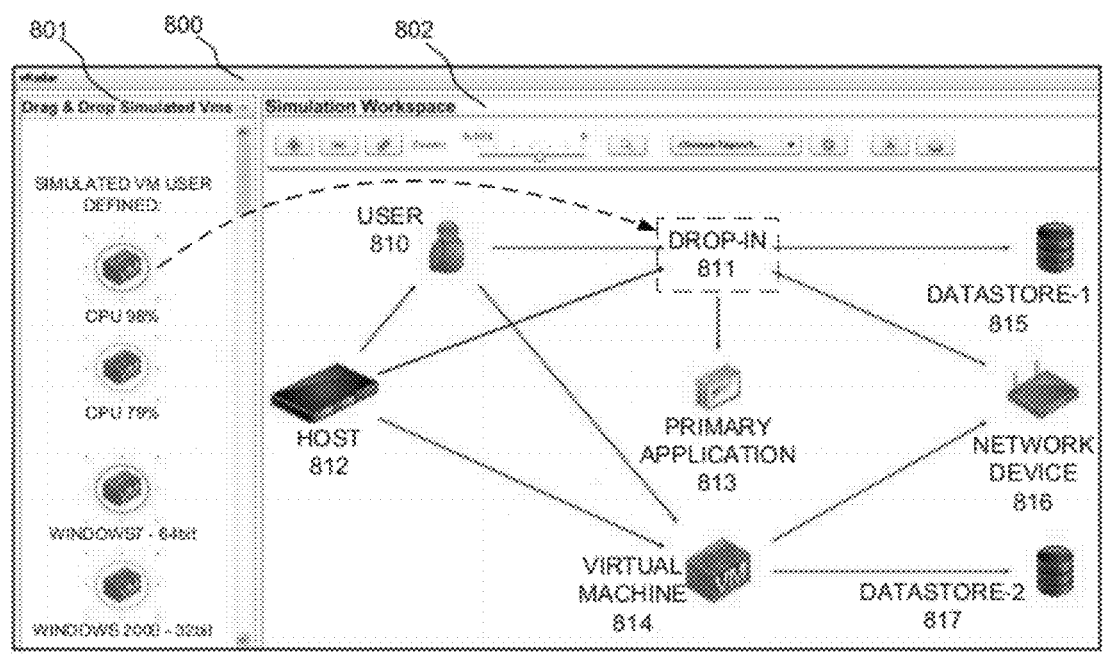
FIG. 8A illustrates an example graphical user interface for simulating performance of a BASG, according to example embodiments of the present invention.
Figure 8B:
FIG. 8B illustrates another example graphical user interface for selecting performance characteristics of a virtual machine, according to example embodiments of the present invention.

The historic operating data should ideally have been recorded no less than 24 hours prior to a new simulation being performed. The web browser 102 provides an update to the user regarding a reasonable expectation of virtual machine performance threshold conditions, as part of the simulation procedure. For instance, such virtual machine performance threshold conditions may be presented to the user as if the user were experiencing the conditions for current operational environments for time periods of one week, one month, three months, etc., while implementing the operating parameters that are provided to the user. The operating parameters selected are always between 0-100% for a given service tier, which, in turn has a corresponding state assigned to each segment of the service tier. Examples of operating parameters are illustrated in FIGS. 8A and 8B, as described in detail below. The operating VM simulation may be an auxiliary GUI provided from the main operating application.

The availability of operating parameters may be constrained by the enterprise node types that have been observed by the system 100. For example, the system 100 classifies each type of enterprise node as having a class with a type, dependency, and data value specification. The system 100 utilizes various types of hosts, virtual machines, networks, and disks. The system 100 utilizes a relationship specification for each of these node types. The node types for simulations may also contain ancillary recognized class types, such as, cluster, primary application, customers, users, and management systems. The classes of host, network, and disk are processed for simulation input.

The "state" data for each of the classes may be used as input. For example, the "Host" may be in a "RED" state due to its CPU being utilized at 98%, The input to the simulator may provide a result, such as, HOST: W2k32B24.CPU98.7.MEM86.2.STO50.2NET21.1. In this example, CPU usage is at 98.7%, memory usage is at 86.2%, storage usage is at 50.2%, and network usage is at 21.1%. The state and profiling engine 626 would color this node "RED" since the highest state parameter is at 98.7%, but the simulator would consider all of these metrics.

In operation, the SPARQL query engine 622 sends a message to the RDF API knowledge base 620 requesting the list of virtual machine candidates for simulation with their corresponding required constraints. The RDF API knowledge base 620 returns a virtual machine list which is then provided to the simulation engine for inclusion in the simulator workspace. According to one example, an example user constraint may be that the CPU average is 98%.

The simulator engine may compile the simulation results and create a simulation ontology, which is sent to the application server 101. The simulation ontology may include, for example, the results, which provide a new "state" for the dependency nodes in the enterprise network that are affected by the user adding or "dropping in" a simulated node (see FIG. 8A). It also provides the associated service tier range that is associated with the state. Rendering the simulation ontology results may provide the user with a snapshot of the simulation results in a web browser 102.

Referring again to FIG. 3, the user may select which candidate virtual machine to insert into the simulated ontology. The simulator generator engine 320 may receive and begin processing the user input to determine where to route the input data. Once one or more identified virtual machines are inserted, the simulator rules engine 330 may be notified by the application server via the web browser 102 to process the expected result of the virtual machine insertion. Results are provided by the simulation rules engine 330, based on inputs from the inference engine 350 and/or the condition engine 360.

The inference engine 350 may perform processing on the inserted virtual machine(s) to determine how that virtual machine operated within the constraints provided by the state and profiling engine 626. If no performance data exists within the predefined constraint factor, then the inference engine 350 will return a message to the simulation rules engine 330 indicating that no historic data is available. Further indications may be used to instead use the default performance data. The inference engine 350 may process the inserted virtual machine to determine how that virtual machine operated within the predefined constraints provided by the user and processed by the state and profiling engine 626.

As a result of the virtual machine processing and simulation efforts, if no data exists within the predefined constraint(s) then the inference engine 350 will return a message to the simulation rules engine 330 stating "no historic data available, use default?" The state and profiling engine 626 may generate the state required for simulation based on the constraints provided by both the virtual machine default thresholds and the adjacent ontological component(s) state profiles. The state and profiling engine 626 generates the state required for simulation (i.e., 98% CPU usage dictates a red state) based on the predefined constraints provided by both the virtual machine type profile and the adjacent ontological component(s) state profiles.

The simulation rules engine may update the ontological view within the simulated state, and connections for the simulated ontologies. The state and profiling engine 626 generates the state required for simulation based on the constraints provided by both the virtual machine type profile and the adjacent ontological component(s) state profiles. The simulation rules engine 330 updates the ontological view provided in the web browser 120. The simulation provides a simulated inventory view in the ontology view. The user may choose to change the simulation by changing user input selections.

Components of the system of FIG. 3 may be part of application server 101 or part of another server hosted by an administrative console (AC) or another machine coupled to the AC via a network.

Figure 4:
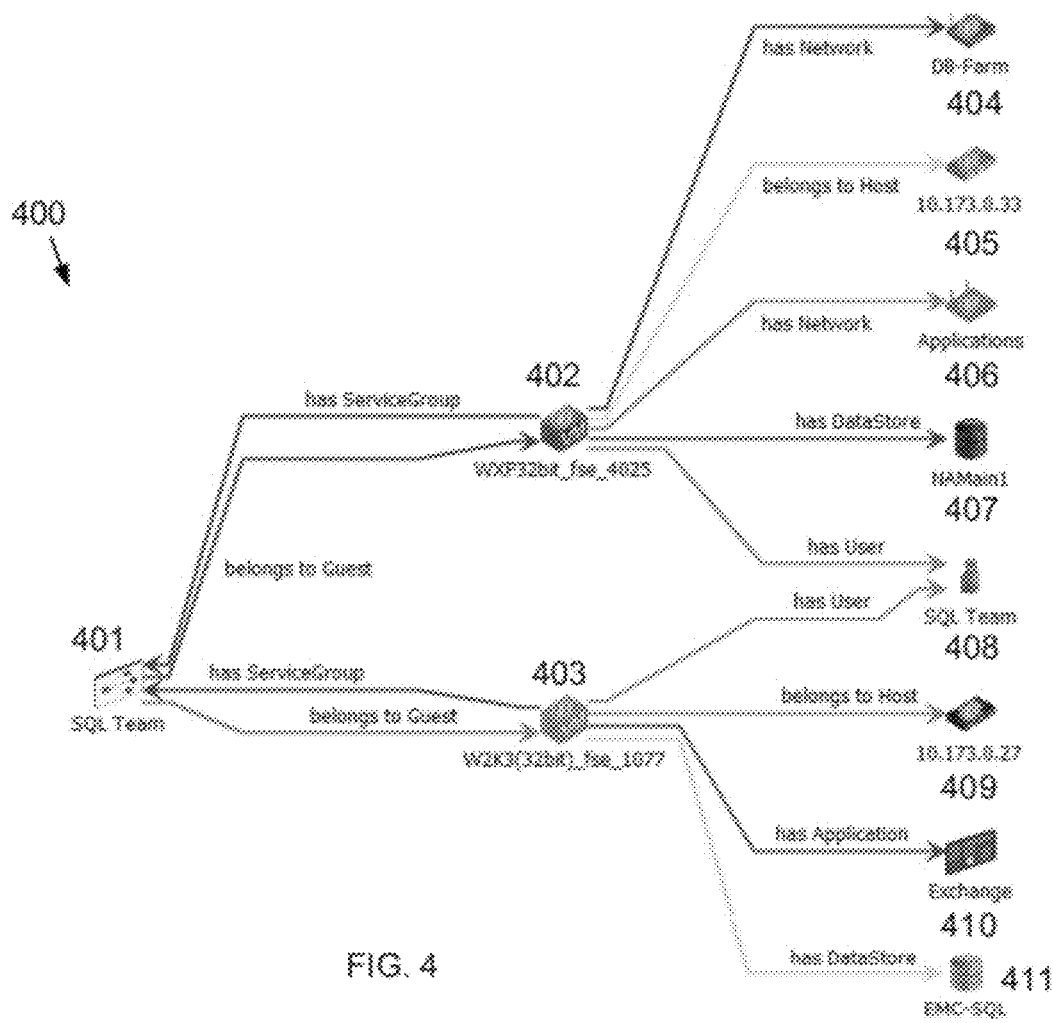
FIG. 4 illustrates a graphical user interface used to view the network hierarchy, according to example embodiments of the present invention.

FIG. 4 illustrates an example GUI according to example embodiments of the present invention. Referring to FIG. 4, a hierarchical logic flow diagram 400 includes a host device 401 and two different virtual machines 402 and 403. The various network resources 404-411 are illustrated as being assigned to at least one virtual machine. Resource icon 404 represents a logical network in the "enterprise" for virtual machine 402. It is associated with a device at the virtual infrastructure management level (i.e., ESX Server), which is a name for the network as it is known to the enterprise for our purposes.

Resource icon 405 is the physical host (hardware) for the virtual machine 402 along with other virtual machines, and is referred to as the hypervisor. Resource icon 406 is the network for virtual machine 402. It is the same as 404, a logical network in the "Enterprise", and is associated with a device at the virtual infrastructure management level (i.e., ESX Server), which is a name for the network as it is known to the enterprise for our purposes.

Resource icon 407 is a datastore for virtual machine 402. It represents a physical allocation of disk storage, and is associated with a hard disk storage device at the virtual infrastructure management level. Resource icon 408 is the "User" assigned to both virtual machines 402 and 403. It has been defined and assigned by this virtualization management software. Resource icon 409 is the host for virtual machine 403. The host is a physical host (hardware) that the virtual machine is running on, along with other virtual machines, and may be referred to as the hypervisor. Resource icon 410 is the primary application that is being executed on the virtual machine 403. Lastly, 411 is the datastore for the virtual machine 403. These resource icons may be dragged and dropped to reassign resources to the virtual machines, and, in turn, modify the allocations of the BASGS.

Figure 5:
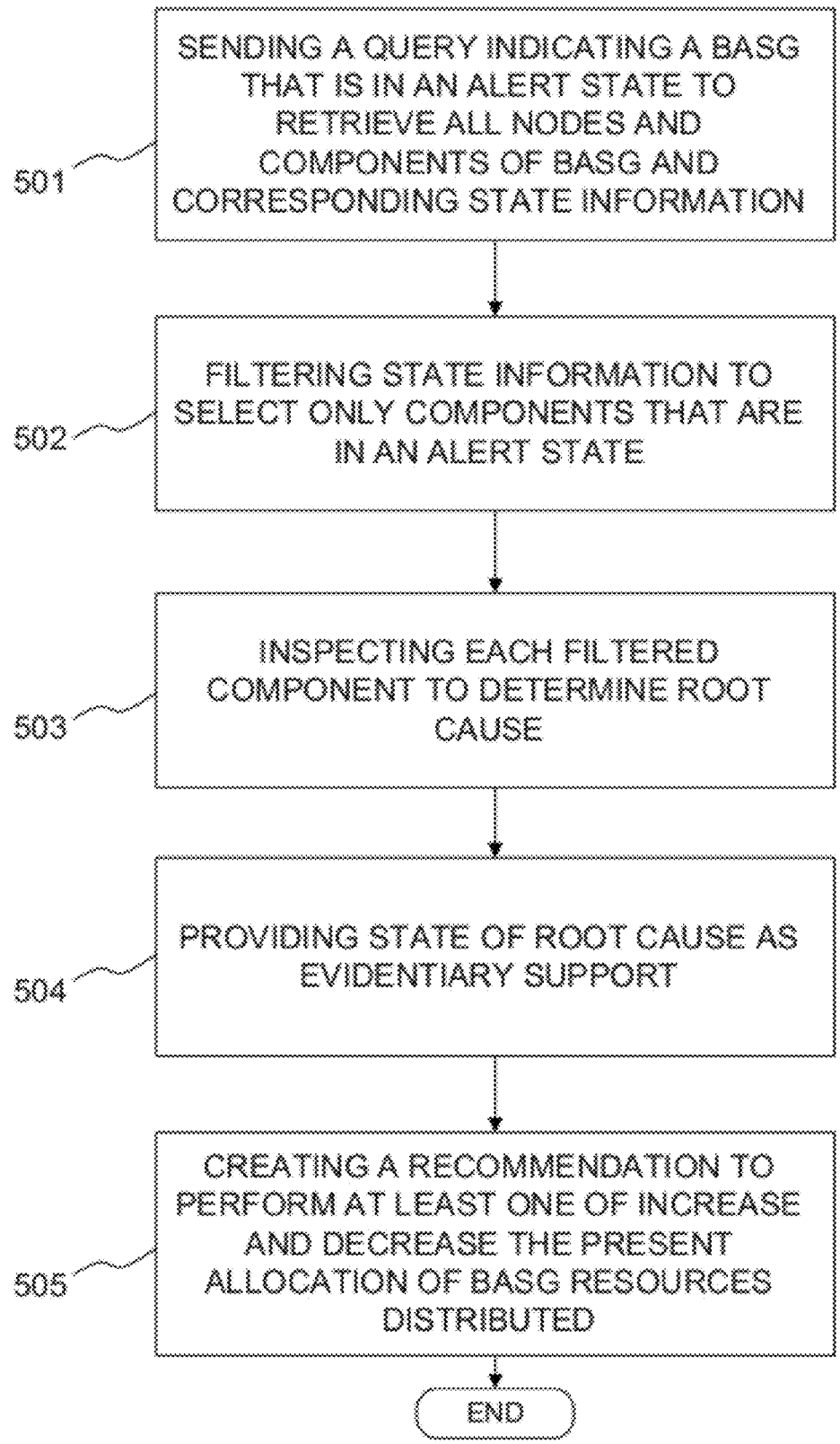
FIG. 5 illustrates an example flow diagram, according to example embodiments of the present invention.

One example method for processing state information of elements of a business process ontology and more specifically for a BASG that is in an error state will now be described with reference to FIG. 5. The method of FIG. 5 may be performed by processing logic that may comprise hardware (e.g., circuitry, dedicated logic, programmable logic, microcode, etc.), software (such as instructions run on a processing device), firmware, or a combination thereof. In one embodiment, the method is performed by a server (e.g., application server 101 of FIG. 1).

At operation 501, a query is sent to the RDF knowledge-base 620 that identifies the BASG that is currently in an error state. The RDF knowledge base 620 returns the list of components of the BASG (e.g., hardware nodes, virtual nodes, executables, processes, primary applications, etc) and their state.

It should be noted that the primary application of the BASG is considered by the RDF knowledge base to be a "node." Any of these components of the BASG may have independent thresholds assigned by the system administrator. Examples of components may include virtual machines, host machines, storage devices, network devices. Examples of resources that are allocated may include memory, CPU, storage disk space, network adapters. Examples of metrics may include a CPU utilization of 1024 Ghz, a memory utilization of 8 gigabytes, a network adapter operating at 100 Mbps, etc.

At operation 502, a filter is applied to determine those components that may have contributed to the "high warning" threshold that was exceeded and which triggered an alarm. In one example embodiment, the filter omits any individual component that has not exceeded a "high warning" threshold individually from the process. This may reduce the chances of false alarms occurring due to random instances of a predefined threshold being exceeded.

At operation 503, the process continues by inspecting each of the filtered components to determine a root cause. The inspection process looks up performance data previously reported by the agents deployed to the nodes. The inspection process may yield all of the component's relevant data for determining a root cause. In one example, the data used for this determination is service tier data, such as, CPU, memory, disk, and network operation threshold roll up data (last 30 days), though other relevant data may also be used.

The root cause process may also use virtualization infrastructure alarms and network status updates. These are available to the system for host, virtual machines, disks, and network devices, and may be sent in messages from a proxy agent. The proxy agent may contain an instruction for translating virtual infrastructure messages to a format that the state and profile engine 626 can process. If, for example, the proxy agent receives a message from the virtual infrastructure stating a disk has achieved full capacity and has an error level of 3, the proxy agent will modify the received message with a translation on the "level of 3" to "High Error". This is then sent to the message driven bean factory 623, where an EJB is created with the contents received from the proxy agent. The business logic then routes the new state EJB to the state and profiling engine 626. This data is provided to the user as support evidence for the root cause conclusion.

The SPARQL Engine 622 determines the state of the primary applications and the contributing executables that make up the primary application by requesting the ontology for the business application service. The ontology is analyzed for breaks in communication with nodes, as described in the Applicant's co-pending applications referenced above.

The SPARQL query engine 622 will send a request to the agent to send back the performance statistics of the executables that make up the primary application of the business application service. This will provide the user with the real-time performance statistics of the executables to provide support for a conclusion that a root cause of failure is due to the failure of the primary application support nodes, at operation 504. The result of conclusion may automatically trigger a recommendation to perform an increase and/or decrease in the present resource allocation of resources provided by a virtual machine(s), at operation 505. For example, CPU resources and disk space may be reallocated from among the network resources by the system administrator as a result or receiving the recommendation. Or, alternatively, certain reallocation measures may be performed automatically.

System 100 may comprise an application server 101, which interacts across a network with a number of data collection agents 500 deployed in various nodes of the network. Advantageously, application server 101, may be an element of an administrative console (AC) that also provides a suite of network management tools. A system administrator may perform network traffic analysis and/or other network management tasks by accessing application server 101 by way of web browser 102. Application server 101 may comprise an EJB module 612, an ontological description creation engine 613, and a web application 111.

Data collection agents 500, as described hereinabove, may be deployed onto network nodes including physical and/or virtual machines in an enterprise IT infrastructure environment. After such deployment, application server 101 receives messages from data collection agents 500. These messages may include data representing, for example, state and relationship information about the network nodes, configuration information related to the IT infrastructure, performance/utilization data and network communication.

The received messages may be initially handled by EJB module 612. For example, message driven EJB module 623 may initially inspect a received message. A received message relating to network traffic or node status may be forwarded by message driven EJB 623 to the business logic EJB 624. Business logic EJB 624 may call network traffic analysis engine 625 for messages relating to network traffic. Alternately, "infrastructure messages" (i.e., those relating to node status) may be forwarded directly to the state and profiling engine 626.

Messages forwarded to the state and profiling engine 626 may there undergo sorting and processing. The state and profiling engine 626, for example, may identify the entities within the IT infrastructure as well as their dependency on one another, based on messages received from the platform. In addition, state and profiling engine 626 may perform further processing to determine the state of one or more entities. The states may be based on a threshold that has been defined, for example, by the system administrator. The threshold may be based on a metric that either exceeds or underperforms in a specific area of interest to the system administrator. An example would be a server operating in a network that is exceeding a specified CPU utilization percentage. The threshold may be set to 80% CPU utilization and if the server is operating at 81%, the threshold is being exceeded.

Example embodiments for determining a required resource allocation of a virtual machine based on thresholds are discussed below. The web application server business logic creates a message request to provide the necessary changes in virtual machine performance allocation variables to create a condition of no critical low and/or no critical high conditions for the next 24 hours. If the recommended change is not successful, the cycle repeats by incrementing the 24 hour period with no critical low and/or no critical high warning by the service tier threshold system. Another 24 hour monitoring period may then begin.

A recommendation of a change in a variable by a factor of 10% (increase or reduction) may be a general modification used to satisfy a threshold condition that has been exceeded/underperformed. The 10% factor modification may be used until the virtual machine exceeds a performance request, which results in the web browser 102 initiating a message to the web application 111 and controllers 627 of the virtual machine. This modification, in turn, creates a message driven entity bean that contains the request, which is transferred to a rules engine. The rules engine sends a request to gather a historical period of information to the web browser 102. Such historical information may be for a period of 1 to 90 days. The rules engine (not shown) may be part of creation engine 613 and/or EJBs 612.

The rules engine message is sent to a database (not shown) to gather the data tables requested. The database sends the data back to the rules engine. The rules engine factors the data resulting in a recommendation to increase or decrease the allocation for each of the performance threshold criteria, which may include, for example, CPU utilization, memory utilization, data storage utilization, and network resource utilization.

The resource modification recommendation is created by the rules engine 613. The creation engine 613 may also be referred to as the rules engine. The rules engine 613 may perform averaging the actual threshold observed by the service tier threshold integer (0-100 scale). The average is only taken from metrics observed while the virtual machine is observed in its normal operating range. If no normal range is observed, than the rules engine will increment the recommended change by increasing or decreasing the allocated resource(s) by 20% until a normal range is observed over a period of 24 hours. According to one example, the recommended increase or decrease is only 10% for a period following 24 hours if the data gathered does contain "normal" range input data.

A proxy agent (not shown) may be part of the local agent that 500 that is used to collect data. In operation, the proxy agent collects data from the virtual infrastructure management provider. The user will utilize the default thresholds or adjust them as deemed necessary. Thresholds are used by the state and profile engine for tracking the "state" of the nodes that make up the components for a business application process. The inventory in the database may be updated by the proxy agent with a list of virtual machines, storage, hosts, and network devices.

The agent may be deployed via the physical hosts connected directly to the virtual machine's O/S. The state and profile engine 626 assigns the "state" of the various network components and receives additional input from the proxy agent to factor into the "state" (e.g., alarms, network, and "communicates_with" relationship status) and updates the RDF knowledge base ontologies to reflect the assignments. The agent tracks executable applications to see what other nodes are communicating with the virtual machines (VMs) in the enterprise.

The traffic analysis engine determines which executable applications and services are communicating with other nodes that constitute a "communicates_with relationship." A determination may be made as to whether any pairs of nodes have a "communicates_with relationship." Upon the assignment of a "commincates_with" relationship to the ontology of a node and its direct and indirect relationships, the state and profiling engine 626 assigns the group of nodes as a "service group."

The RDF knowledge base 620 contains an ontology for each individual node. The model and structure the system uses to create and update the knowledge base is contained within the ontology web language (OWL) file present on the application server 101. The state and profiling engine 626 tracks the "state" continually of the components and receives additional input from the proxy agent to factor into the "state" (e.g., alarms, network, and "Communication_with" relationship status).

The user may identify a "service group" of network nodes as a business application service group (BASG) by selecting a name for the group of nodes and the executables that are the basis for the "communicates_with" relationship. The user may also add nodes that the system did not auto-detect as a component of the service group. Those added nodes will be recorded and stored in the ontology model 621.

A determination may then be made as to whether the user has assigned additional nodes and/or names to the service group. The ontology itself provides the direct and indirect dependency information of the nodes that the SPARQL query engine 622 requires to infer the impact a change in "state" will have on the rest of the service group. For instance, if a storage device's (component) state is changed to "RED" because it is almost full (e.g., only two gigabytes left of a 1500 gigabyte memory) then this may cause the physical host to start the paging memory, which will effect the performance of any and all virtual machines running on that physical host.

The SPARQL query engine 622 parses the service group ontology for the components that have a "communicates_with" relationship, which forms the basis for a primary application. The state and profiling engine 626 tracks the "state" of the BASG by requesting the current "state" from the RDF knowledge base 620 and updating the ontology when any new messages are received from the business logic EJB factory 624. A new message can be created by an agent or the virtual infrastructure provider management system. The new message will include items, such as, new hosts, virtual machines, network devices, storage devices, as well as statuses for these items. The inference engine 633 adds these items into the RDF API knowledge base 620 while it is in memory. If any of these items exist as components, then the new data is added/modified in the ontology stored in memory.

For example, SPARQL query engine 622 provides a list of candidate BASG members for base-lining and adjusting that may be needed to achieve "normal" acceptable performance levels. By parsing the BASG ontology for primary applications that have "communicates_with" relationships with "virtual machines" that have operated in a "normal" level of threshold for 3 consecutive business cycles may yield a list of qualifying components. SPARQL query engine 622 may parse the BASG ontology to determine the components that have a "communicates_with" relationship. Such components may be used to form the basis for a primary application. SPARQL query engine 622 may generate a list of virtual machine BASG members pairing recommendation.

Web application server 101 may receive the message to survey the virtual machines for their CPU and/or memory usage over the past 30 days. Web application server 101 may send a request to the state and profiling engine 626 to compile the usage data from the database. The state and profiling engine 626 sends a message to the business Logic that compiles the Database Query. The business logic 624 generates an EJB based query that includes a request for CPU and memory usage data for the last 30 days.

According to example embodiments of the present invention, the SPARQL query engine 622 may parse the service group ontology data to determine the components that have a "communicates_with" relationship. This relationship information may be used to form the basis for a primary application. The user may communicate via a web interface of the web application 111 and assign a name to the service group.

The state and profiling engine 626 tracks the "state" of the BASG as an aggregate of each of the components of the BASG, by requesting the current "state" from the RDF API knowledge base 620 and updating the ontology information when any new messages are received from the business logic 624 of the EJBs 612. SPARQL query engine 622 provides a list of BASGs that may be used for base-lining and for making any adjustments to achieve "normal" acceptable performance levels. Parsing the BASG ontologies for primary applications that have "Communicates_with" relationships with "virtual machines" that have operated in a "normal" threshold level for three consecutive business cycles may yield those virtual machines and/or states that have remained in a green state.

The business logic 624 may perform requesting the service groups from the RDF API knowledge base 620. The SQARQL query engine 622 then initiates a query to gather all the class, object properties, and data values from the API knowledge base 620. The SQARQL query engine 622 may simultaneously initiate a query for performance threshold data from a remote database (not shown). The performance threshold data may include three separate instances of normal threshold data within a business application process cycle (BAPC). The BAPC may include a session that provokes network activity that is observed by the agent of the corresponding executable of the primary application for the BASG.

Once the communication has ceased and is verified by the user via the web browser 102, a message may be sent through the controllers 627 to the business logic 624. The BAPC may be assigned as a baseline candidate by the resulting EJB 612, which, in turn, records the candidate into a database. Candidates are then created automatically by the system 100 via the SPARQL query engine 622 which performs initiating a query for any existing candidates. The query may be performed upon startup of the application server 101. The SPARQL query engine 622 creates an EJB 612, which, in turn, sends a Java® message service (JMS) message to the agent to observe network traffic that is created by an executable contained within a primary application. This results in a base-lined BASG that can be monitored for changes just as a single entity may be monitored within the configuration drift system.

The BASG baseline may be monitored for changes by utilizing a configuration drift analysis by the state and profiling engine. SPARQL query engine 622 may provide a list of identified BASG baselines. These baselines may then be inserted into the state and profiling engine 626 for a configuration drift analysis. Drifting may include any changes that have occurred from a previous BASG configuration. For example, a component (class), an object value (verb), or, a data value, such as, the state of any of the assets of a BASG, each represent examples of potential changes that may occur.

After a drift analysis is performed, the SPARQL query engine 622 provides the business logic 624 of the EJB 612 with a message detailing a list of BASGs, and updates the user by providing the information via the web browser 102. The user selects one or more of the baselines of the BASGs. The baseline may be selected for use by a future simulation engine and/or for use by a future prediction engine.

Another example method of the present invention may include a simulation being setup and performed, according to the following example with reference to FIGS. 1 and 3. Referring to FIGS. 1 and 3, the simulation rules engine 330 may transmit a request to the database 340 for data that has been recorded no less than 24 hours prior to the simulation being performed. The simulator generator engine 320 provides an ontology workspace based on the ontology that existed in the RDF API knowledge base 620 for the corresponding enterprise network, with the exception of the virtual machine components.

The SPARQL query engine 622 may send a request for a set of constraints based on the historical data contained within the database. The constraints may be automatically generated based on the historical data obtained. For example, a +/−10% or 20% modification to the measured operating parameters (CPU usage, memory usage, disk usage, network usage, etc.) may be applied to create a simulation of distributed resources and/or resource capacity of the network nodes. For example, the measured operating parameters are read out of the database 340 for the BASG members. The read-out procedure is performed when a BASG for simulation is selected by the user. The user does not need to gather the operating parameters, as they are already in the database 340 since the service tiers have already been setup when you the system 100 is in use. The operating parameters are the result of the system 100 monitoring operational usage and assigning state(s) based on the defined service tiers.

The system 100 may utilize various different types of hosts, virtual machines, networks, and disks. The system 100 utilizes a relationship specification for each of these node types. The web browser 102 updates the user with a reasonable expectation of virtual machine performance threshold conditions, as if the user were experiencing the conditions for current operational environments for time periods, such as, one week, one month, three months, etc., based on the selected parameters that are provided for or by the user.

The node types for simulations may also include ancillary recognized class types, such as, cluster, primary application, customers, users, and management systems. Only the classes of host, network, and disk are processed for simulation input. Historic data for the operational usage of the BASGs involved with a simulation is retrieved from the database 340. The SPARQL query engine 622 sends a message to the RDF API knowledge base 620 requesting the list of virtual machine candidates for simulation with the constraints required. The RDF API knowledge base 620 returns the virtual machine list which includes the names of the machines, their node ID numbers and their state, and a numerical number for the highest parameter level observed that contributed to the state on the GUI example, which is then provided to the simulation rules engine 330 for inclusion in the simulator workspace.

The RDF API knowledge base 620 returns the virtual machine list, which is then provided to the simulation rules engine 330 for inclusion in the simulator workspace. The simulator engine sends the simulated ontology to the application server 101 for rendering by the ontology view application within the web browser 102.

The simulator workspace allows the user to see if a particular VM or user defined VM would operate efficiently with the other members of a BASG. The simulation may save a virtual administrator time by avoiding arduous trial and error experimentation to find optimal network devices and resources. The virtual simulation may be based on actual historical parameters observed in an operational environment. The final result would provide a user with the capability to see how a simulated VM would affect the BASG. For example, a determination may be made as to whether all devices and resources are operating efficiently (i.e., operating in a green state), or, does the simulation create a condition that negatively affects the BASG members' state.

FIGS. 8A and 8B illustrate example GUIs that may be used to perform a network simulation and set corresponding operating thresholds, according to example embodiments of the present invention. Referring to FIG. 8A, a GUI 800 includes an example BASG 802 and a drag and drop simulated VM workspace 801. A user may select a virtual machine with predefined operating conditions and dropping it into the drop-in area 811 of the simulation workspace. The BASG may include a user 810, a host 812, a primary application 813, a second virtual machine 814, a datastore-1 815, a second datastore-2 817 and a network device 816.

Referring to FIG. 8B, a simulated VM, as illustrated in the drag and drop portion of FIG. 8A, may be defined by the threshold characteristics illustrated in FIG. 8B. The service tier thresholds may be edited manually by a system administrator. In this example, two different network resources are illustrated to include CPU utilization and memory utilization. These resources may be provided by a virtual machine operating on the network. Other resources (not shown) but described herein may also be modified by this GUI.

According to one example, a CPU threshold may be established via menu option 801. Service tier thresholds may include various different levels, such as, a low error threshold, a low warning threshold, a high warning threshold and a high error threshold. Similarly, a menu option 802 may be used to modify thresholds for memory utilized. These various threshold levels may be established automatically and/or manually by a system administrator. The user may select a threshold window that the system may use to monitor operational usage.

According to one example, if the user sets a red zone "red" to be between 90-100% CPU usage, then the state of the node in question will be set to a red if the operational usage condition of 90-100% occurs 3 times within 5 minutes (or a similar set of occurrences). The threshold is set by the user per the high error threshold of 90% usage. Similarly, a high warning threshold of 80% may be set to create an orange zone warning at 80% or more CPU usage, which may be used to merely notify the system administrator that a first threshold has been exceeded. On the flip side, the low CPU usage may be monitored by a low performance threshold including a low warning threshold and low error threshold set at 20% and 10%, respectively. Similar operational parameters may be established to monitor disk usage, and, other metrics not shown.

The user may use the web browser 102 to select which candidate virtual machine to insert into the simulated ontology. Once one or more virtual machines are inserted into the simulated ontology, the simulation rules engine 330 is notified by the application server 101 via the web browser 102 to process the expected result of the virtual machine insertion. Results from the simulation are provided by the simulation rules engine 330 based on inputs from the inference engine 350 and condition engine 350. For example, inference engine 350 processes the inserted virtual machine(s) to determine how that virtual machine operates within the predefined constraints provided by the state and profiling engine 626. If no data is produced (i.e., no data falls between the predefined constraints defined in FIG. 8B), based on the predefined constraints then the inference engine 350 will return a message to the simulation rules engine 330 stating that "no historic data is available, use default data?" Or, another message may be displayed that "there are no available simulated VMs, please decrease your service tier constraint parameters for simulation."

The inference engine 350 processes the inserted virtual machine(s) to determine how that virtual machine(s) operated within the constraints provided by the state and profiling engine 626. The state and profiling engine 626 generates the state required for simulation based on the predefined constraints provided by both the virtual machine default thresholds and the adjacent ontological components state profiles. If data is produced, then the state and profiling engine 626 generates the state required for simulation based on the predefined constraints provided by both the virtual machine type profile and the adjacent ontological component state profiles.

The simulation rules engine 330 updates the ontological view within the simulated state and the connections for the simulated ontologies. The state and profiling engine 626 generates the state required for the simulation based on the constraints provided by both the virtual machine type profile and the adjacent ontological components state profiles. As a result of the simulation, the simulation rules engine 330 updates the ontological view in the web browser 102. The simulation provides a simulated inventory view in the ontology view. The user may choose to change the simulation by changing their previous selection or by ending the simulation.

Figure 6:
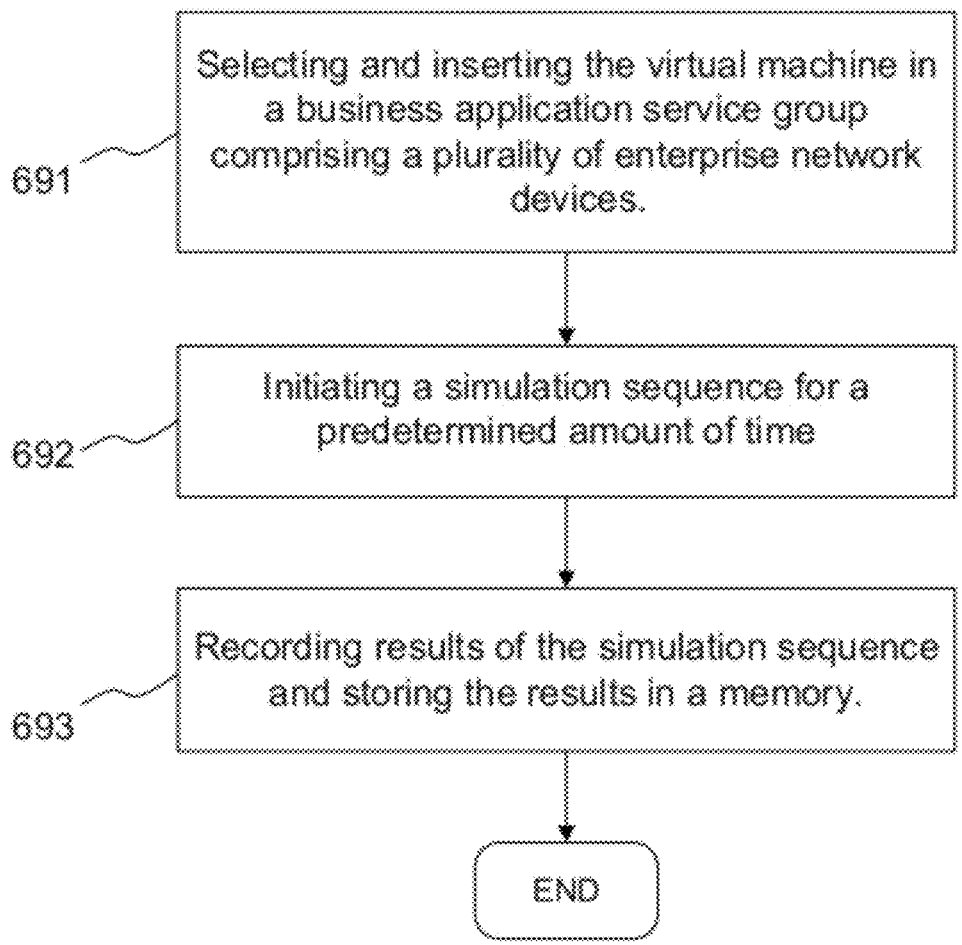
FIG. 6 illustrates another example flow diagram, according to example embodiments of the present invention.

One example method according to example operations of the present application may include simulating performance characteristics of a virtual machine, as illustrated in FIG. 6. The method of FIG. 6 may be performed by processing logic that may comprise hardware (e.g., circuitry, dedicated logic, programmable logic, microcode, etc.), software (such as instructions run on a processing device), firmware, or a combination thereof. In one embodiment, the method is performed by a server (e.g., application server 101 of FIG. 1).

A virtual machine may be selected and inserted into a business application service group that includes a plurality of enterprise network devices, at operation 691. The simulation may include a simulation sequence that is performed for a predetermined amount of time to view the results of the proposed modification, at operation 692. The results of the simulation sequence may be obtained and stored in memory, at operation 693, or, realized in real-time by the administrator to determine whether the proposed modification to the enterprise network is acceptable.

Figure 7:
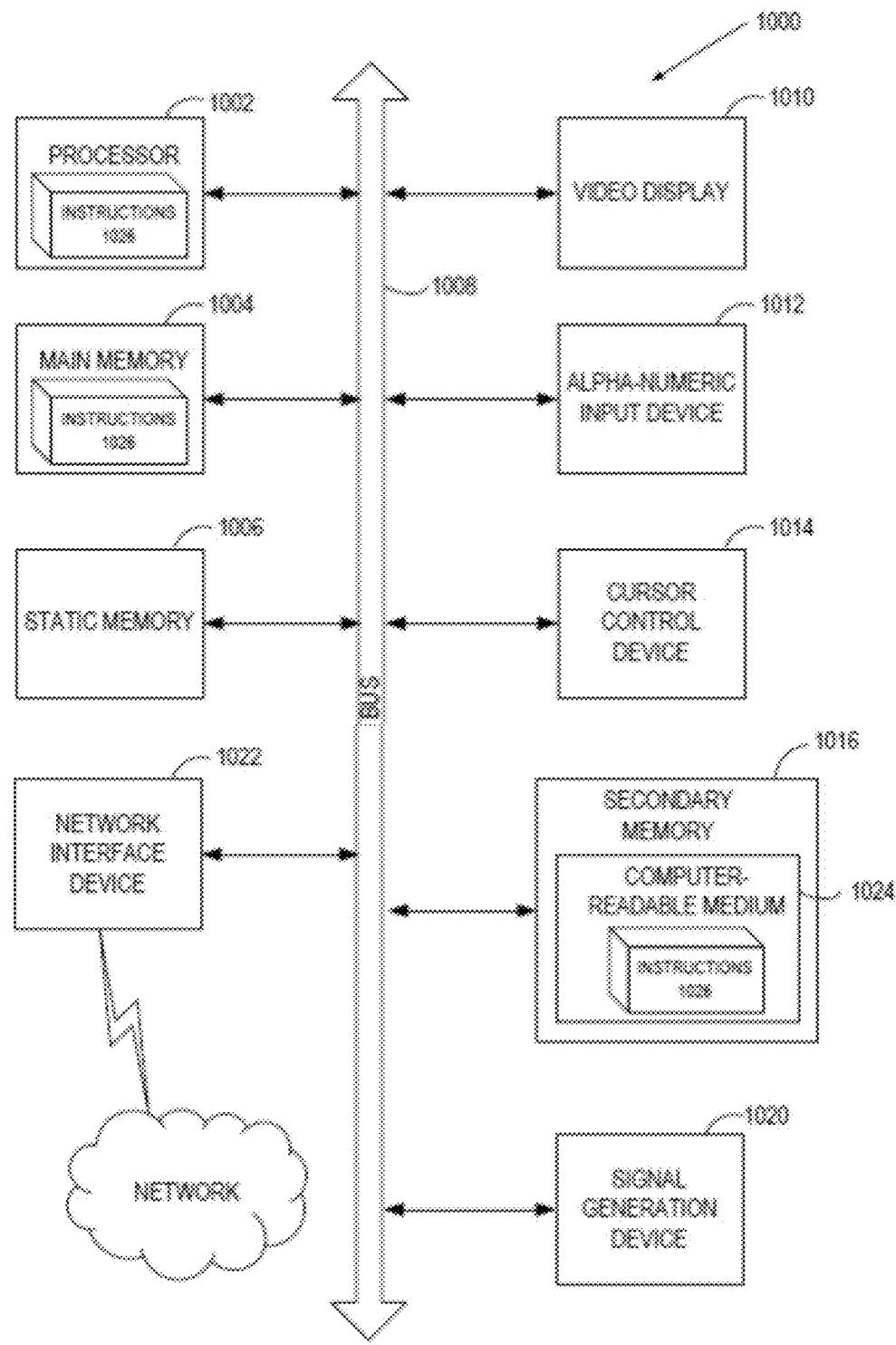
FIG. 7 is a block diagram of an exemplary computer system that may perform one or more of the operations described herein, according to example embodiments of the present invention.

FIG. 7 illustrates a diagrammatic representation of a machine in the exemplary form of a computer system 1000 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a secondary memory 1016 (e.g., a data storage device), which communicate with each other via a bus 1008.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. Processing device 1002 is configured to execute instructions 1026 for performing the operations and steps discussed herein.

The computer system 1000 may further include a network interface device 1022. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker).

The secondary memory 1016 may include a machine-readable storage medium (or more specifically a computer-readable storage medium) 1024 on which is stored one or more sets of instructions 1026 embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting machine-readable storage media.

The machine-readable storage medium 1024 may also be used to store software performing the operations discussed herein, and/or a software library containing methods that call this software. While the machine-readable storage medium 1024 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "determining", "encrypting", "decrypting", "sending" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method comprising:
    identifying a business application service group comprising a plurality of nodes to communicate with each other to provide functionality of a business application, the plurality of nodes including a plurality of enterprise network devices that comprise one or more virtual machines;

selecting, by a processing device, an additional virtual machine for the business application service group based on a profile requirement of the virtual machine;

inserting the additional virtual machine in the business application service group;

initiating a simulation sequence for the additional virtual machine for a predetermined amount of time in view of a first set of constraint parameters associated with a first set of threshold performance characteristics of the additional virtual machine;

determining that an insertion of the additional virtual machine into the business application service group does not satisfy the first set of constraint parameters, and performing the simulation sequence for the additional virtual machine in view of a second set of constraint parameters associated with a second set of threshold performance characteristics of the additional virtual machine, to evaluate performance of the business application service group in providing the functionality of the business application; and recording results of the simulation sequence and storing the results in a memory.

2. The method of claim 1, further comprising:
selecting the first set of threshold performance characteristics prior to selecting and inserting the additional virtual machine in the business application service group.

3. The method of claim 2, wherein the first set of threshold performance characteristics is at least one of a CPU threshold usage, a memory threshold usage, a network resource usage or a disk threshold usage.

4. The method of claim 1, wherein the plurality of enterprise network devices further include at least one of a host device, or a datastore device.

5. The method of claim 1, wherein initiating a simulation sequence pertaining to the first set of threshold performance characteristics of the additional virtual machine for a predetermined amount of time comprises using predetermined historic data of operational usage characteristics of the plurality of enterprise network devices.

6. The method of claim 5, wherein the operational usage characteristics of the plurality of enterprise network devices is in view of a last 24 hours of operation of the business application service group.

7. The method of claim 1, wherein the predetermined amount of time is at least one of one week, one month, or three months.

8. An apparatus comprising:
a processor to identify a business application service group comprising a plurality of nodes to communicate with each other to provide functionality of a business application, the plurality of nodes including a plurality of enterprise network devices that comprise one or more virtual machines, select an additional virtual machine for the business application service group based on a profile requirement of the virtual machine, insert the additional virtual machine in the business application service group, to initiate a simulation sequence for the additional virtual machine for a predetermined amount of time in view of a first set of constraint parameters associated with a first set of threshold performance characteristics of the additional virtual machine, to determine that an insertion of the additional virtual machine into the business application service group does not satisfy the first set of constraint parameters, and to perform the simulation sequence for the additional virtual machine in view of a second set of constraint parameters associated with a second set of threshold performance characteristics of the additional virtual machine, to evaluate performance of the business application service group in providing the functionality of the business application; and a memory, coupled to the processor, to store recorded results of the simulation sequence.

9. The apparatus of claim 8, wherein the first set of threshold performance characteristics is selected prior to inserting the additional virtual machine in the business application service group.

10. The apparatus of claim 9, wherein the first set of threshold performance characteristics is at least one of a CPU threshold usage, a memory threshold usage, a network resource usage or a disk threshold usage.

11. The apparatus of claim 8, wherein the plurality of enterprise network devices includes at least one of a host device, or a datastore device.

12. The apparatus of claim 8, wherein the processor is to initiate the simulation sequence for the predetermined amount of time using predetermined historic data of operational usage characteristics of the plurality of enterprise network devices.

13. The apparatus of claim 12, wherein the operational usage characteristics of the plurality of enterprise network devices is based on a last 24 hours of operation of the business application service group.

14. The apparatus of claim 8, wherein the predetermined amount of time is at least one of one week, one month, or three months.

15. A non-transitory computer readable storage medium comprising instructions that when executed cause a processor to:
identify a business application service group comprising a plurality of nodes to communicate with each other to provide functionality of a business application, the plurality of nodes including a plurality of enterprise network devices that comprise one or more virtual machines;

select, by the processor, an additional virtual machine for the business application service group based on a profile requirement of the virtual machine;

insert the additional virtual machine in the business application service group;

initiate a simulation sequence for the additional virtual machine for a predetermined amount of time in view of a first set of constraint parameters associated with a first set of threshold performance characteristics of the additional virtual machine;

determine that an insertion of the additional virtual machine into the business application service group does not satisfy the first set of constraint parameters, and perform the simulation sequence for the additional virtual machine in view of a second set of constraint parameters associated with a second set of threshold performance characteristics of the additional virtual machine to evaluate performance of the business application service group in providing the functionality of the business application; and record results of the simulation sequence and storing the results in a memory.

16. The non-transitory computer readable storage medium of claim 15, the processor further to:

select the first set of threshold performance characteristics prior to selecting and inserting the additional virtual machine in the business application service group.

17. The non-transitory computer readable storage medium of claim 16, wherein the first set of threshold performance characteristics is at least one of a CPU threshold usage, a memory threshold usage, a network resource usage or a disk threshold usage.

18. The non-transitory computer readable storage medium of claim 15, wherein the plurality of enterprise network devices includes at least one of a host device, or a datastore device.

19. The non-transitory computer readable storage medium of claim 15, wherein to initiate a simulation sequence pertaining to a first set of threshold performance characteristics of the virtual machine for a predetermined amount of time, the processor is further to use predetermined historic data of operational usage characteristics of the plurality of enterprise network devices.

20. The method of claim 1, wherein an ontology of the business application service group is updated in view of the stored results of the simulation sequence.

\* \* \* \* \*